United States Patent [19]

Litchford

[11] 4,027,307
[45] May 31, 1977

[54] COLLISION AVOIDANCE/PROXIMITY WARNING SYSTEM USING SECONDARY RADAR

[75] Inventor: George B. Litchford, Northport, N.Y.

[73] Assignee: Litchstreet Co., Northport, N.Y.

[22] Filed: May 9, 1975

[21] Appl. No.: 576,143

Related U.S. Application Data

[63] Continuation of Ser. No. 317,810, Dec. 22, 1972, abandoned.

[52] U.S. Cl. .................... 343/6.5 LC; 343/112 CA
[51] Int. Cl.² .......................................... G01S 9/56
[58] Field of Search ..... 343/6.5 LC, 6.5 R, 112 CA

[56] References Cited

UNITED STATES PATENTS

| 2,146,724 | 2/1939 | Dunmore | 343/112 CA |
|---|---|---|---|
| 2,515,332 | 7/1950 | Budenbom | 343/15 |
| 2,796,602 | 6/1957 | Hess et al. | 343/6.5 LC |
| 2,886,796 | 5/1959 | Wallace | 343/112 CA |
| 2,971,190 | 2/1961 | Busiynies | 343/112 R |
| 3,035,260 | 5/1962 | Freedman et al. | 343/6.5 R |
| 3,112,484 | 11/1963 | McKeown | 343/112 R |
| 3,160,879 | 12/1964 | Downing et al. | 343/112 R X |
| 3,199,101 | 8/1965 | Hansel | 343/6.5 R X |
| 3,204,237 | 8/1965 | Overcash | 343/6.5 R |
| 3,341,846 | 9/1967 | McMurren et al. | 343/6.8 LC |
| 3,344,420 | 9/1967 | Arsove | 343/6.5 R |
| 3,349,402 | 10/1967 | Foster | 343/6.5 R X |
| 3,611,371 | 10/1971 | Morse | 343/112 CA X |
| 3,653,049 | 3/1972 | Thayer et al. | 343/112 CA |
| 3,713,161 | 1/1973 | Rice | 343/6.5 R |
| 3,792,472 | 2/1974 | Payne et al. | 343/6.5 LC |

FOREIGN PATENTS OR APPLICATIONS 1,146,559  3/1969  United Kingdom

Primary Examiner—Malcolm F. Hubler
Attorney, Agent, or Firm—Brumbaugh, Graves, Donohue & Raymond

[57] ABSTRACT

Proximity indication and evaluation of mobile vehicles, using the signals emitted by the hundreds of existing secondary radar ground stations and the nearly 100,000 cooperating transponders on the vehicles, to detect intrusion in a monitored proximity volume and to determine slant range and/or relative bearing to the intruder.

51 Claims, 27 Drawing Figures

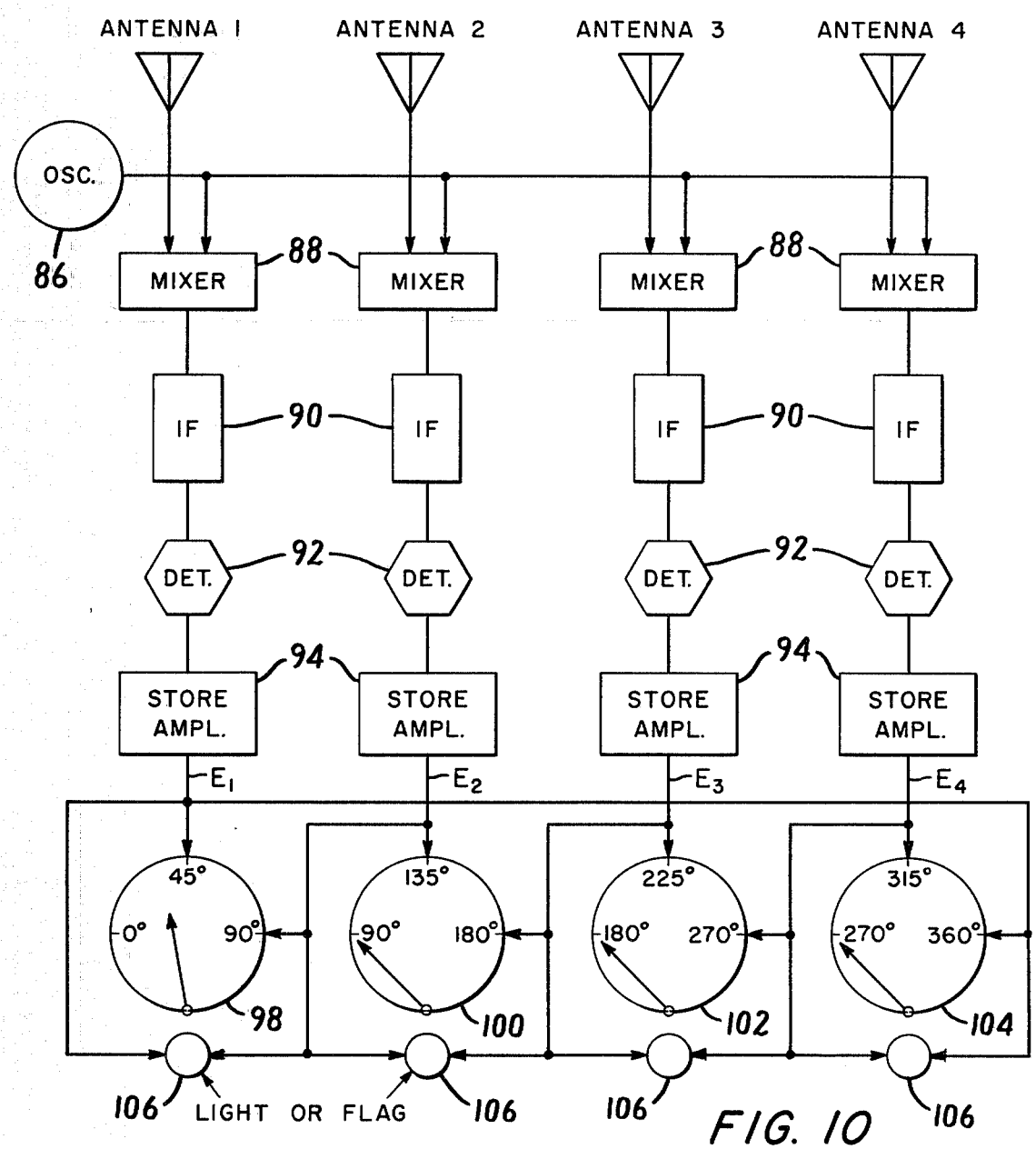
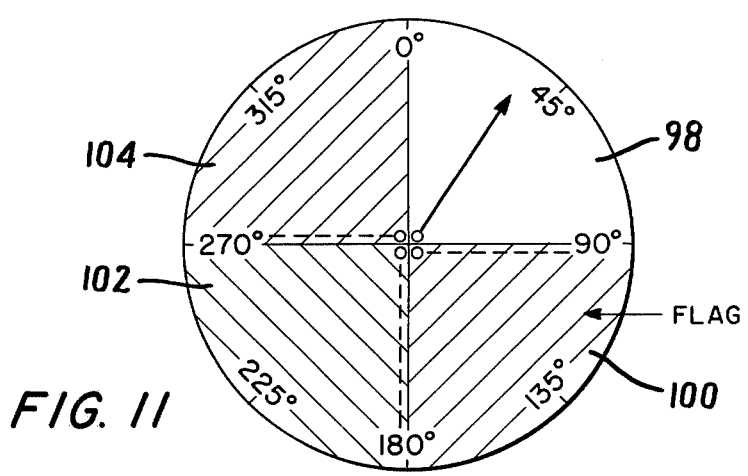
FIG. 10
FIG. 11

COLLISION AVOIDANCE/PROXIMITY WARNING SYSTEM USING SECONDARY RADAR

CROSS-REFERENCE TO RELATED PATENTS AND APPLICATIONS

This is a continuation of application Ser. No. 317,810, filed Dec. 22, 1972, now abandoned.

This aplication is related to the following United States patents and patent applications:
1. U.S. Patent No. 3,626,411 of George B. Litchford, issued Dec. 7, 1971.
2. U.S. Patent appplication Ser. No. 130,952 of George B. Litchford, filed Apr. 5, 1971 now U.S. Pat. No. 3,735,408.
3. U.S. Patent application Ser. No. 180,578 of George B. Litchford, filed Sept. 15, 1971 now U.S. Pat. No. 3,757,324.
4. U.S. Patent application Ser. No. 371,883 of George B. Litchford, filed June 20, 1973, now U.S. Pat. No. 3,858,210.
5. U.S. Patent application Ser. No. 371,839 of George B. Litchford, filed June 20, 1973, now U.S. Pat. No. 3,858,211.
6. U.S. Patent application Ser. No. 568,270 filed Apr. 15, 1975 (and now allowed) for reissue of U.S. Pat. No. 3,858,211.
7. U.S. Patent application Ser. No. 481,902 of George B. Litchford, filed June 21, 1974, now U.S. Pat. No. 3,921,172.
8. U.S. Patent application Ser. No. 495,271 of George B. Litchford, filed Aug. 7, 1974, now U.S. Pat. No. 3,959,793.
9. U.S. Patent application Ser. No. 345,432 of George B. Litchford, filed Mar. 27, 1973, now U.S. Pat. No. 3,875,570.
10. U.S. Patent application Ser. No. 438,297 of George B. Litchford, filed Jan. 31, 1974, now U.S. Pat. No. 3,895,382.
11. U.S. Patent application Ser. No. 599,961 of George B. Litchford, filed July 29, 1975.

BACKGROUND OF THE INVENTION

The present invention pertains to radiolocation of mobile vehicles within the coverage of at least one scanning radar of a secondary radar system.

More particularly, the invention concerns a collision avoidance/proximity warning system, capable of determining the slant range and/or relative bearing to mobile vehicles, that is based on secondary radar such as the National Air Traffic Control Radar Beacon System (ATCRBS) and the International Civil Aviation Organization (ICAO) Secondary Surveillance Radar System.

Major airports and way points are presently equipped with secondary surveillance radar (SSR) adapted to cooperate with transponders carried on aircraft to discriminate against interference and ground clutter and to provide for transmission of identification and other data, such as altitude, from the aircraft to the ground-based radar. A traffic controller observing the radar display directs the pilots of the involved aircraft by radio, usually with voice communication, so as to maintain or restore safe separations between aircraft. Such a system is limited in capability because each aircraft must be dealt with individually and requires its share of the controller's time and attention and its share of the available radio spectrum. When traffic is heavy, take-offs and landings are delayed, and the possibility of collision increases.

The number of mid-air collisions and near misses has become so large in recent times that numerous inter-aircraft cooperative proximity warning systems have been proposed. Those more prominently under study or development at this time involve frequent or quasi-continuous exhange of singals between all cooperative aircraft within the region of interest and make no provision for non-cooperating aircraft. The required airborne equipment would be bulky and expensive, use more of the already crowded radio spectrum and would be generally independent of other needed and existing equipment, such as transponders. Another drawback of some of the proposed systems is that they provide only relative positional information, without ground reference but in effect with respect to a randomly floating reference.

At least some of the disadvantages of these proposed systems may be overcome by providing aircraft with a proximity warning indicator based on the already existing secondary surveillance radar system. Particularly if the range and bearing of all aircraft in the proximity of one's own aircraft can be obtained entirely passively — i.e., by merely "listening" to the transponder replies of nearby aircraft to interrogations of radar ground stations — it will be possible to provide an effective warning in time to avoid collisions without major outlay for an entirely new system and without utilizing an additional portion of the radio spectrum.

SUMMARY OF THE INVENTION

It is therefore an object of the present invention to provide apparatus for determining passively the range and/or bearing of those mobile vehicles within a selectable proximity to one's own position from interrogation replies of the vehicle transponders in a secondary radar system.

This object, as well as other objects which will become apparent in the discussion that follows, is achieved, according to the present invention by providing a direction-finding attenna and circuit for indicating the angle of incidence of transponder replies and providing means for selecting or determining the slant range of or to the replying transponders in dependence upon the time of receipt of the transponder replies.

In a first preferred embodiment of the present invention the bearing to a replying transponder is indicated only if this transponder is located within a selected region of space. This is accomplished by enabling the direction finder to indicate the angle of incidence of a transponder reply after a first predetermined period following receipt of a transponder interrogation and disabling the direction finder from indicating the angle of incidence of a transponder reply after a second, longer predetermined period following receipt of the transponder interrogation.

In a second preferred embodiment of the present invention the bearing to a replying transponder is indicated only if this transponder is located within a selected range of altitudes. This is accomplished by enabling the direction finder to indicate the angle of incidence of a transponder reply only if the altitude encoded in that reply is not greater than a first specified altitude or less than a second specified altitude.

In a third preferred embodiment of the present invention, the bearing to a replying transponder is indicated together with the slant range of that transponder. The slant range is determined either entirely passively from the bearing measurement and measurement of the difference between the time of receipt of an interrogation and a transponder reply thereto, or is determined actively by transmitting interrogations and measuring the time difference between a transmission and a received reply.

BRIEF DESCRIPTION OF THE DRAWINGS

FIGS. 5–13 illustrate a typical direction-finding system which may be used with the embodiment of FIG. 2, or with any other embodiment of the present invention.

FIG. 5 is a plan view of a direction-finding antenna employed in the direction-finding system of FIGS. 5–13.

FIG. 6 is a diagram of the radiation pattern of the direction-finding antenna of FIG. 5.

FIG. 7 is a diagrammatic view showing the construction of the direction-finding antenna of FIG. 5.

FIG. 8 is a plan view showing the construction of the four antenna elements of the direction-finding antenna of FIG. 5.

FIG. 9 is a plan view of aircraft showing alternative positions of the four antenna elements of the direction-finding antenna of FIG. 5.

FIG. 10 is a block diagram of the preferred embodiment of the direction-finding system according to the present invention.

FIG. 11 is an elevational view showing the face of a bearing indicator which may be used with the direction-finding system of FIG. 10.

FIG. 12 is an expanded rectangular plot of the radiation pattern of the direction-finding antenna of FIG. 5.

FIG. 13 is a detailed diagaram of a portion of FIG. 12, illustrating the amplitude comparison technique employed with the direction-finding system of the present invention.

DESCRIPTION OF THE PREFERRED EMBODIMENTS

The preferred embodiments of the present invention will now be decribed in connection with FIGS. 1–27 of the drawings.

Figure 1:
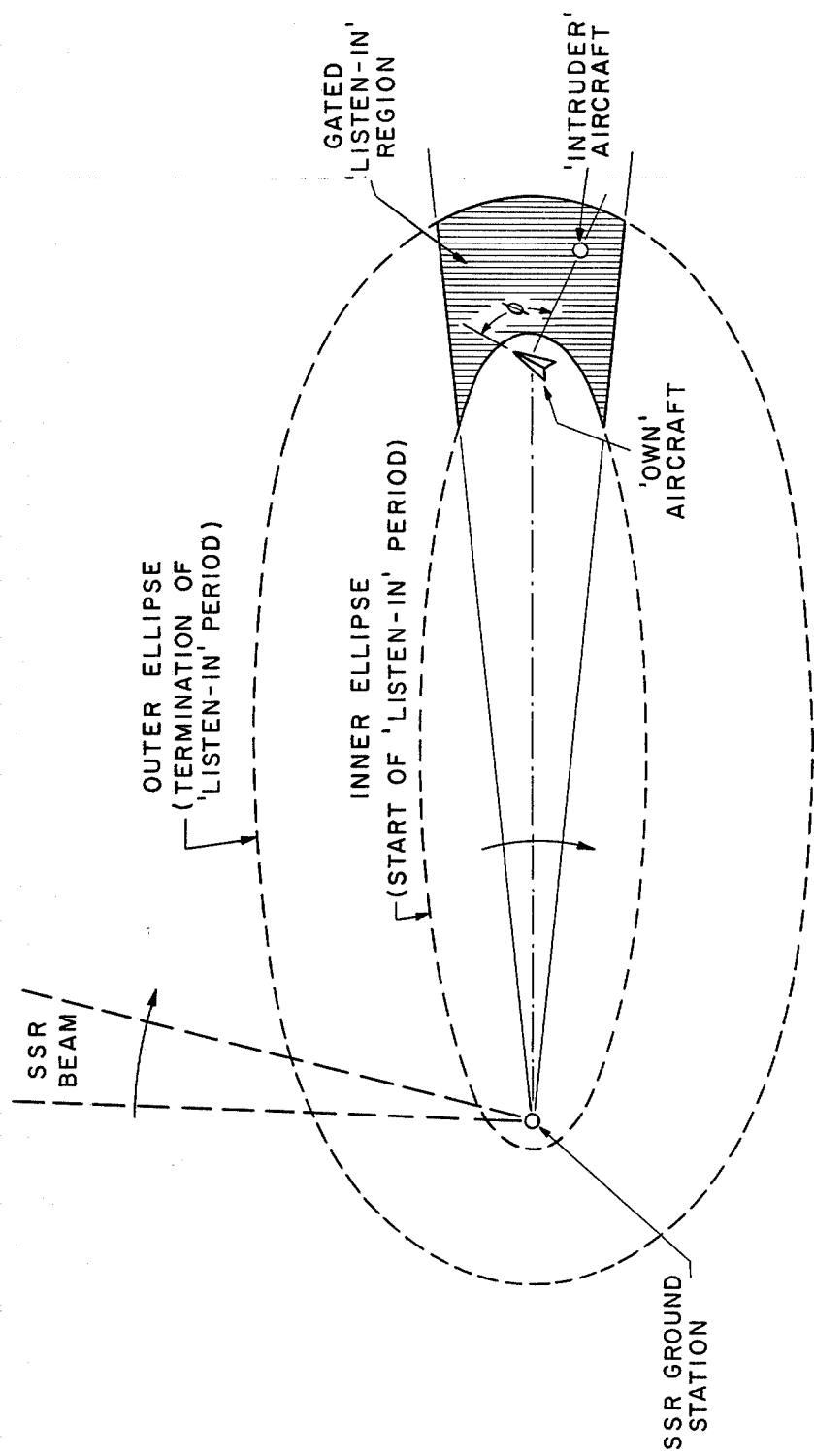
FIG. 1 is a geometrical diagram showing a secondary surveillance radar beam and a typical positional relationship between two aircraft.

FIG. 1 illustrates the standard ICAO secondary surveillance radar system in which an SSR ground station repeatedly transmits interrogations at a frequency of 1030 MHz on a continuously rotating beam. The beam, which is conventionally between 3° and 4° wide, sweeps the sky in the clockwise direction, completing one revolution in a period of approximately 4 to 10 seconds.

All commercial transport aircraft and nearly all other aircraft that utilize major airports are equipped with transponders which reply to interrogations received from SSR ground stations. As each SSR beam sweeps past an aircraft, it interrogates that aircraft transponder from about 15 to 25 times at intervals of about 2 to 5 msec. Each interrogation initiates a reply transmission from the transponder at a frequency of 1090 MHz.

The transponder reply includes two so-called "framing pulses" which are spaced apart in time by 20.3 $\mu$sec. The interval between the framing pulses contains a number of discrete sub-intervals, in eac'1 of which a pulse may or may not be transmitted, depending upon what information is to be contained in the reply. Twelve such sub-intervals are available, permitting 4,096 different binary code groups, each representing one or more pieces of information such as identity, barometric altitude, distress signal, and so on. The desired reply code group may be set into the transponder by the operator of the aircraft using manual code wheel switches, or in some cases automatically or semi-automatically, for example by pressing a button.

Conventionally, each aircraft transponder is alternately interrogated to transmit the identity (A mode) and the altitude (C mode) of its aircraft. The replies to these alternate interrogations are decoded at the SSR ground station and utilized to place both indentity and altitude on the radar display of the ground controller adjacent the spot which represents the aircraft that is transmitting the replies.

The first framing pulse of the reply of a transponder follows the end of a received interrogation by a standard delay of 3 μsec. The second framing pulse is transmitted 20.3 μsec after the first framing pulse. The transponder is then automatically disabled for an interval of about 120 μsec, called the "dead time."

During this dead time it is possible for an aircraft to listen for replies of nearby aircraft to the same interrogation to which its own transponder has just replied. This listen-in period may be controlled by the operator of the aircraft to gate open a desired "listen-in region" of the sky. All aircraft which intrude upon this listen-in region will be detected, but no aircraft outside this region will result in a proximity indication requiring attention by the operator.

As shown in plan view in FIG. 1, the gated listen-in region is bounded on the side closest to the "own" aircraft by a portion of an ellispse, called the "inner ellipse," having the SSR ground station and the "own" aircraft as its foci. The listen-in region is bounded on the side farthest from the own aircraft by an "outer ellipse," also having the SSR ground station and the own aircraft as its foci. The inner and outer ellipses are actually ellipses of revolution or ellipsoids; however, the listen-in region may be bounded above and below the own aircraft by horizontal planes at selected altitudes which cut through these ellipsoids to define a laminar volume between the altitudes.

The listen-in region is also bounded laterally by essentially vertical planes defined by the moving edges of the SSR beam, since the transponder of an intruder aircraft must be interrogated by the beam for its reply to be heard at the own aircraft.

Not only is it useful for the operator of the own aircraft to know that an intruder aircraft exists in the listen-in region, it is also useful for him to know the bearing of the intruder aircraft with resepct to the axis of his own aircraft, so that he may obtain visual contact of the intruder aircraft and, if necessary, take corrective action to avoid a collision. This bearing of the intruder aircraft with respect to the axis of the own aircraft has been designated in FIG. 1 as that angle φ.

Figure 2:
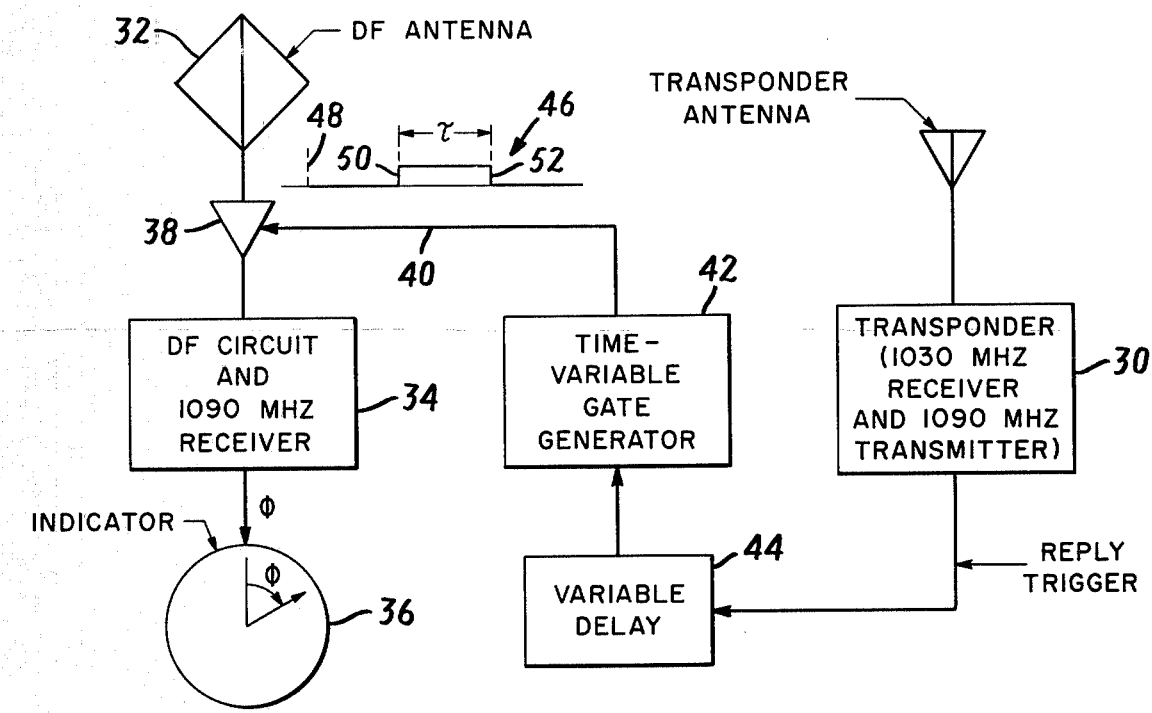
FIG. 2 is a block diagram of one preferred embodiment of the present invention.

FIG. 2 illustrates one embodiment of apparatus, according to the present invention, for determining the angle φ entirely passively from the transponder reply of an intruder aircraft which is detected in the listen-in region. This apparatus is designed to be compatible with existing transponders and may be carried on an aircraft or located wherever it is useful to obtain bearings to nearby transponders.

The apparatus of FIG. 2 comprises a conventional transponder 30 of the type commonly carried on board an aircraft. This transponder includes a 1030 MHz receiver for receiving interrogations transmitted by one or more SSR ground stations, and a 1090 MHz transmitter for transmitting replies intended to be received by the SSR ground station and utilized by the ground contoller.

The apparatus of FIG. 2 also comprises a direction-finding system which includes a direction-finding ("DF") antenna 32, a 1090 MHz receiver and DF circuit 34 and a bearing indicator 36. The direction-finding system is designed to determine the bearing to any transponder-carrying aircraft that is located within the listen-in region by determining the angle of incidence of the 1090 MHz transponder replies on the DF antenna 32.

The direction-finding system in the apparatus of FIG. 2 is also provided with a gate 33 between the DF antenna 32 and the receiver 34 which blocks the passage of transponder reply signals from the antenna to the receiver unless gated open by a signal on line 40. In practice, such a gate can consist merely of biased diodes connected between the DF antenna leads and ground. When forward biased, the diodes function to ground the leads and inhibit transmission of signal energy, while under reverse bias the diodes are effectively absent from the circuit.

The gating signal on line 40 is supplied by a gate generator 42 which, in turn, is initiated by a pulse from a variable delay element 44. The variable delay 44 receives a "reply trigger pulse " from the transponder 30 and initiates the gate generator 42 a prescribed time later.

In its normal operation, the transponder 30 produces a reply trigger pulse in response to each interrogation. This pulse is used internally to initiate the reply, and is also available or may be made available at an external terminal.

In the operation of the apparatus of FIG. 2, the transponder 30 produces a reply trigger pulse in response to each 1030 MHz interrogation as the SSR beam sweeps past the transponder antenna. This trigger pulse is applied to the variable delay element 44 to await completion of the transponder reply. During the following period of 20.3 μsec, the transponder 30 transmits its 1090 MHz reply. Shortly thereafter, at a time selectable by adjusting the variable delay element 44, the variable delay passes the trigger pulse to gate generator 42. This gate generator immediately produces a signal on line 40 opening the gate 38 permitting any transponder replies that fall on the DF antenna 32 to be passed to the 1090 MHz receiver 34.

The gating signal appearing on line 40 is represented in the diagram, indicated generally by the reference numeral 46. Sometime after the reply trigger pulse, indicated in dash lines as 48, the gate generator 42 produces the gating pulse 46 for a period "τ." This period τ may be selected by adjusting or varying the gate generator 42 in a manner to be described herinafter. The leading edge 50 of the gating pulse 46 follows the reply trigger pulse by a delay determined by the variable delay element 44. The termination 52 of the gating pulse 46 follows the leading edge 50 by the periiod τ.

During the period τ that the gate 38 is opened, the direction-finding system will determine the angle of incidence of any transponder reply that is received. This period τ, from the leading edge 50 to the trailing edge 52 of the gating pulse 46, is thus the "listen-in period" which defines the listen-in region illustrated in FIG. 1. Adjusting the time occurrence of the leading edge 50 (by adjusting the variable delay element 44) adjusts the size of the inner ellipse, while adjusting the time occurrence of the trailing edge 52 (by adjusting the time-variable gate generator 42) adjusts the size of the outer ellipse.

Since the gated listen-in region is several nautical miles (NM) wide in three dimensions, it is desirable, in the case of aircraft-to-aircraft collision avoidance/-proximity warning, to inhibit indication of proximity when the altitude of an intruder aircraft lies so far above or below the altitude of the own aircraft that no possibility of collision exists. For example, if the own aircraft is proceeding in level flight, the operator of the own aircraft may be interested in obtaining a proximity indication for only those intruder aircraft which lie within ±1500 feet (approximately ¼ NM) of his own altitude.

Figure 3:
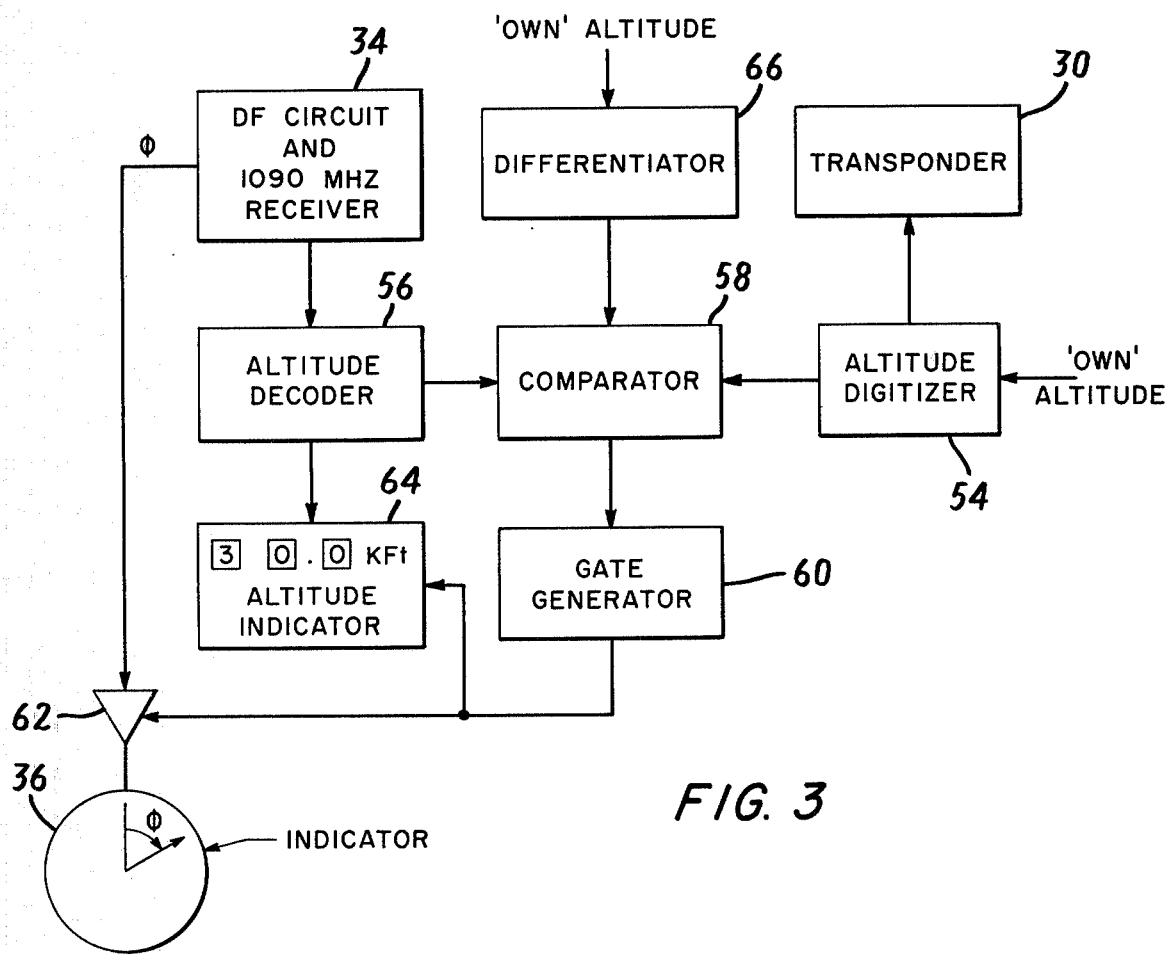
FIG. 3 is a block diagram of an altitude gating system which may be employed with the embodiment of FIG. 2, or with any other embodiment of the present invention.

The altitude selection of intruder aircraft for which proximity is indicated may be effected, for any of the embodiments of the present invention described herin by means of the apparatus shown in FIG. 3. Like the embodiment of FIG. 2, the apparatus of FIG. 3 includes a transponder 30 and a direction-finding circuit 34 which supplies bearing information to an indicator 36. The "own altitude" of the own aircraft is supplied by an altimeter (not shown) to an altitude digitizer 54. This digitizer encodes the altitude for use by the transponder 30 in its reply to a C mode interrogation by an SSR ground station. The altitude digitizer 54 is standard equipment on all commercial aircraft and its use may soon be required for general aviation as well to provide the ground-based air traffic controllers with the altitude of every airborne aircraft.

The DF circuit and 1090 MHz receiver 34 supplies the transponder replies of intruder aircraft to an altitude deocder 56. The altitiude decoder may be of conventional design; i.e., the type used by SSR ground stations to decode altitudes form transponder replies.

The digitized altitude of the own aircraft and the decoded altitude of an intruder aircraft are supplied to a comparator 58 which produces a pulse if and only if the two altitudes are within prescribed limits of each other. This pulse is supplied to a gate generator 60 which opens a gate 62 that allows the bearing information to pass to the indicator 36. The gate generator 60 also enables an altitude indicator 64 that displays the altitude of the intruder aircraft consequently, should the intruder aircrft fall within the altitude limits selected in the comparator 58, the operator of the own aircraft will receive an indication of both the bearing and altitude of the intruder aircraft. The period of the gate generator 60 is taken sufficiently long (say from 4 to 10 seconds) so that the bearing and altitude indication will be maintained for the entire rotation of any interrogating SSR beam.

The altitude limits both above and below the own altitude, for which proximity of an intruder aircraft will be indicated, may be set into the comparator 58 using manual code wheel switches. For example, if the operator of the own aircraft is interested in knowing whether any intruder aircraft lie in the gated listen-in region within 1500 feet above or 1500 feet below his own altitude, he may manually set a first set of code wheel switches to "+01.5K" and set a second set of code wheel switches to "−01.5K".

The the alternative, the limits of comparison may be automatically selected in dependence upon the own aircraft's altitude and/or the direction of change of its altitude and/or the rate of change of its altitude. For example, if the aircraft is climbing, its operator may wish to know whether intruder aircraft exist within the listen-in region up to 3000 feet above the own aircraft's altitude. Conversely, upon descent, the operator may wish to have indicated the proximate intruder aircraft which lie within −3000 feet of the own aircraft's altitude. Accordingly, the apparatus of FIG. 3 includes a differentiator 66 which determines the direction and the rate of change of the own aircraft's altitude and supplies this information to the comparator 58 to automatically increase or decrease the comparison limits.

Notwithstanding the usefulness of any device for automatically varying the comparison limits, the comparator 58 should be provided with a manual override to permit the operator to adjust the comparison limits in accordance with flight conditions. For example, in the terminal control area in which aircraft are densely stacked but must fly at a speed below 200 knots, the operator may wish to set the comparison limits to ±500 feet, notwithstanding rapid changes in the own aircraft's altitude.

Figure 4:
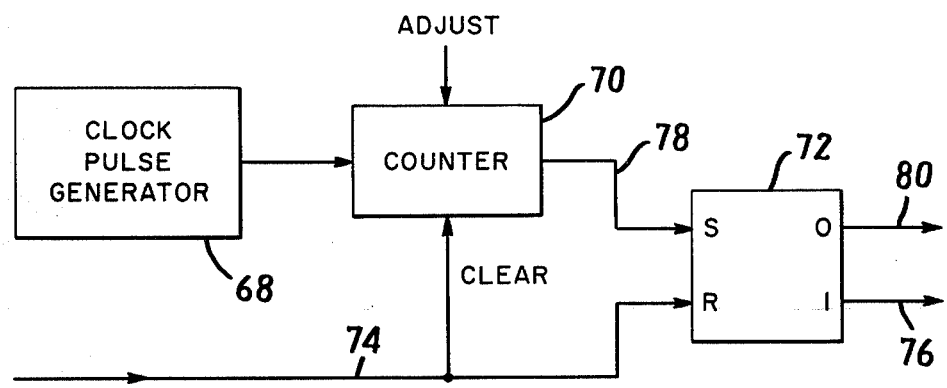
FIG. 4 is a block diagram of a time-variable gate generator which may be used with the embodiment of FIG. 2, or with any other embodiment of the present invention.

FIG. 4 shows one type of time-variable gate generator which may be used with any of the embodiments of the present invention. This gate generator comprises a clock pulse generator 68, a pulse counter 70, and a flip-flop 72 connected as shown. An input pulse on line 74 clears the counter 70 and sets the flip-flop 72 to its 1 state, energizing the output line 76. When the counter has counted a number of clock pulses equivalent to the desired gate time interval, it produces an output pulse on line 78, setting the flip-flop to its 0 state and deenergizing line 76, thereby terminating the gate signal. The inverse of the gate signal on line 76 is available on the output line 80. The period of the gate signal on either line 76 or line 80 may be adjusted by varying the pulse repetition rate of the clock pulse generator 68. Alternatively, it is possible to adjust the counter 70 as shown in FIG. 4, so that the output pulse on line 78 will be produced when the counter reaches a higher or lower count.

Figure 5:
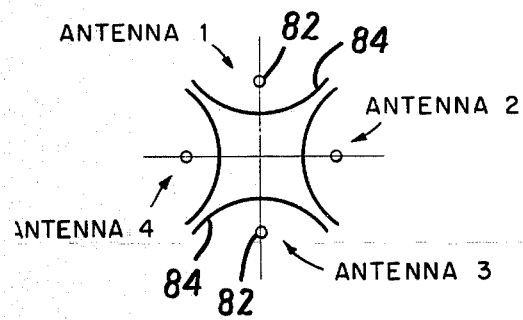

FIGS. 5–13 illustrate a direction-finding system which may be used with any of the embodiments of the present invention. FIG. 5 shows a DF antenna consisting of four separate and independent antenna elements each having a radiator element 82 and reflector 84. These four antenna elements are clustered and directed as shown so that their radiation patterns are evenly distributed about the full 360°.

Figure 6:
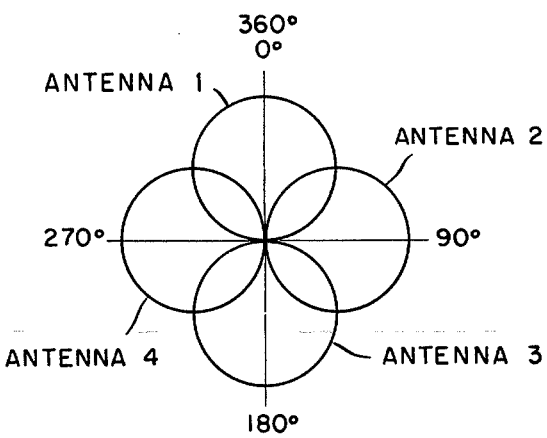

FIG. 6 illustrates the radiation patterns of the four antenna elements of FIG. 5. As shown, each antenna element exhibits a directional pattern having a maximum arranged at 90° with respect to the maxima of the two adjacent patterns.

It will be understood that the radiation pattern of the direction-finding antenna is not limited to the pattern illustrated in FIG. 6. The separate, independent antenna elements may be constructed differently to provide a different pattern. In addition, the number of antenna elements is not constrained to four; either a fewer or a greater number of elements may be provided.

Figure 7:
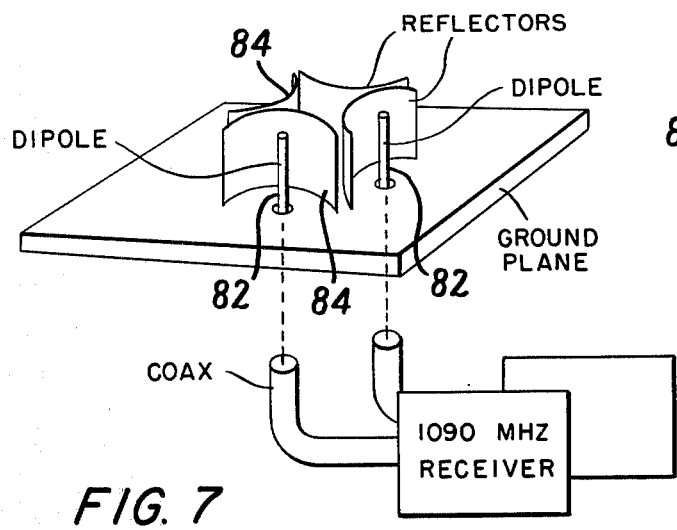
Figure 8:
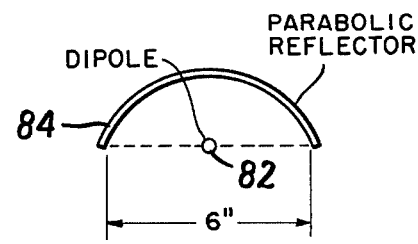

FIGS. 7 and 8 show the physical construction of the direction-finding antenna of FIG. 5. The reflector 84 for each of the four antenna elements is a small sheet metal device about 3 to 4 inches high and about 6 inches wide. The reflector is connected to a ground plane which is formed by a plate or the skin of an aircraft.

The reflector follows a parabolic curve in its transverse section. The radiator element 82 is arranged at the focus of the parabola and is connected through the ground plane to a coaxial cable extending to receiver apparatus in the interior of the aircraft.

Figure 9:
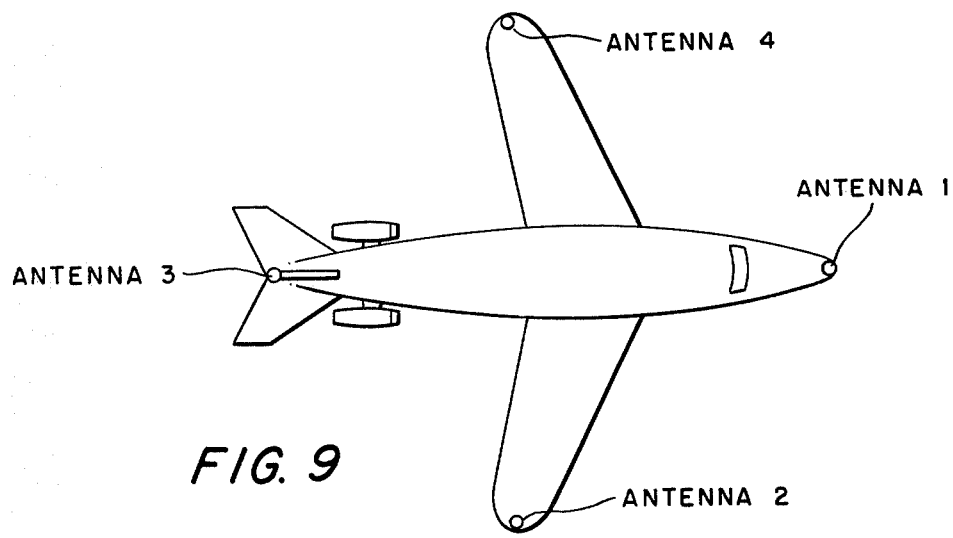

FIG. 9 shows an alternative arrangement of the four antenna elements of FIG. 5. In this embodiment the antennae are arranged at the four extremities of an aircraft to minimize the absorptive and reflective effect the aircraft may have upon reception.

FIG. 10 shows the entire receiving and direction-finding circuit which may be used with the DF antenna of FIGS. 5-9. Each of the four antenna elements is connected to a separate receiver which has the same gain as the other receivers. Techniques for controlling the gain by AGC, so that all the receivers have identical gain, are well known. One method is to periodically inject into the receivers a locally generated, common intermediate frequency signal, so that the same input level is applied to each, and to simultaneously set the AGC of each IF stage to equalize the levels at all receiver outputs. This may be done every few seconds for about a 10 msec interruption of the four receivers, so that no significant data will be lost.

As shown in FIG. 10, the direction-finding system according to the present invention includes a common local oscillator 86 for adding a signal at fixed frequency to the signal received from each antenna element. The common oscillator is used for economy only; parallel oscillators may also be used as no phase coherence is required. The signals from the oscillator 86 and the four antenna elements are separately combined in mixers 88 and passed to IF stages 90 which are tuned to pass the 1090 MHz energy. The amplitude of the energy is detected by separate detectors 92 and stored in separate storage devices 94. Each storage device stores a DC voltage equal to the signal pulse levels received by its corresponding receiver and supplies this DC voltage, indicated as $E_1$, $E_2$, $E_3$, and $E_4$, respectively, to a pair of zero-centered meters. The voltage $E_2$ is supplied to meters 98 and 100; the voltage $E_3$ is supplied to meters 100 and 102; the voltage $E_4$ is supplied to meters 102 and 104; and the voltage $E_1$ is supplied to meters 104 and 98. In addition, each voltage is supplied to a corresponding pair of indicator lights and/or flag alarms 106.

In operation, the four zero-centered meters 98-104 comprise an amplitude comparison system which converts the four voltages $E_1$, $E_2$, $E_3$, and $E_4$ into an indication of angle. The voltage $E_1$ feeds current through meter 98 in one direction while the voltage $E_2$ feeds current therethrough in the opposite direction,, giving a deflection of the needle to the center of the meter when the two voltages are equal. A deflection to the right or left of center will occur depending upon whether $E_1$ is larger than $E_2$ or vice versa.

Figure 12:
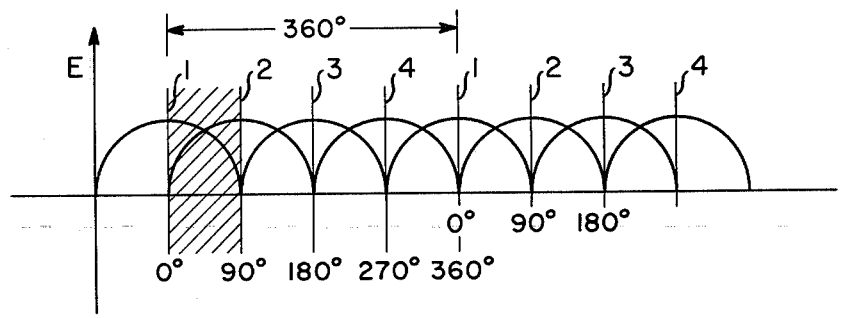
Figure 13:
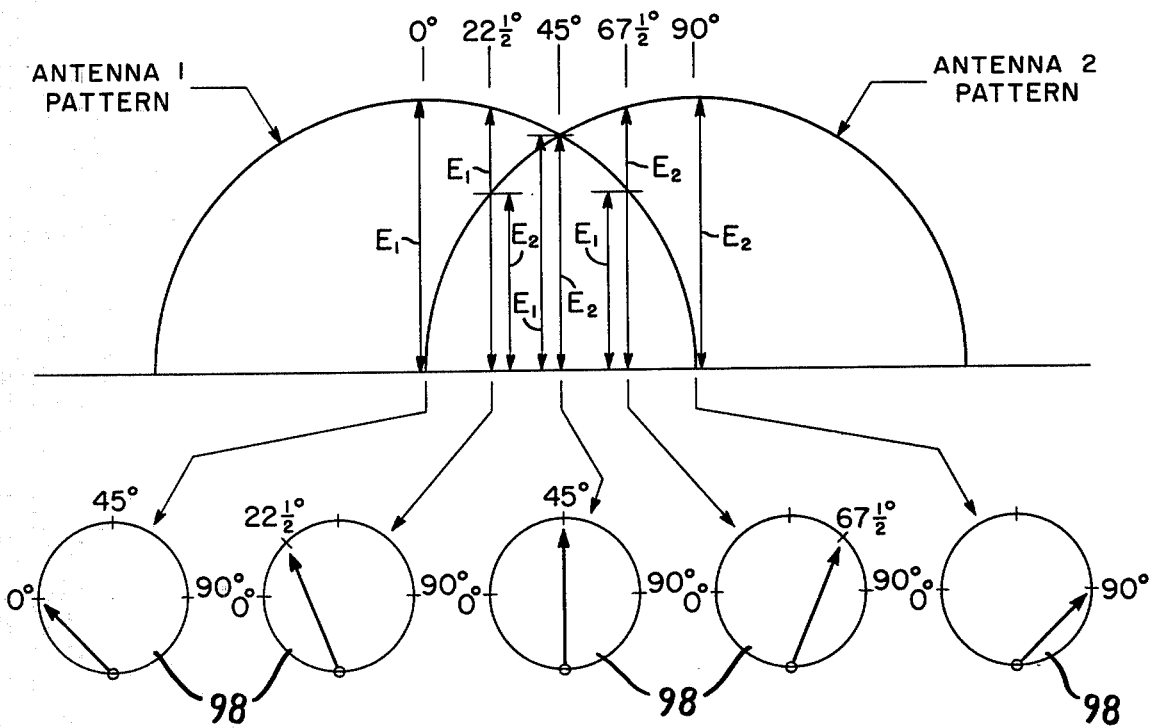

The relation between the DC voltages and the needle indication is illustrated in FIGS. 12 and 13. In FIG. 12 the radiation patterns of the four antenna elements have been converted from the polar coordinates of FIG. 6 into rectangular coordinates. Each antenna pattern has been indicated with the number of its corresponding antenna element. The shaded area in FIG. 12 represents the sector of 360° which is indicated by the first meter 98.

FIG. 13 shows the shaded area of FIG. 12 in detail. In this area, the amplitudes of $E_1$ and $E_2$ are compared in the meter 98 to deflect the meter needle to the appropriate angle. Five different angles of incidence of radiation on the antenna elements 1 and 2 are shown.

It will be appreciated that when four zero-centered meters are used, it may be difficult for the operator to tell at a glance which meter is indicating the bearing of the incident radiation. This difficulty is alleviated by providing each meter with a light or flag alarm 106 which alerts the operator to the meter in operation.

In the case of the light, the operator's attention is directed to that meter associated with the light that burns the brightest. In the case of the flag alarm, all the meters are covered by a plate, or "flag," until sufficient signal is received to move the flag away from the face of the meter. In this case, the operators's attention is directed to that meter that has its face uncovered.

FIG. 11 shows how the four meters 98, 100, 102 and 104 might be arranged in quadrature to form a single dial showing angles from 0° to 360°. Each meter is provided with a separate flag alarm so that the flags will leave uncovered only that portion of the meter to which the operator's attention should be directed. In the illustration, the meters 100, 102 and 104 have their flags, up, covering the corresponding sectors of the dial, while the meter 98 has its flag down exposing the sector 0° – 90°.

It will be understood that the direction-finding system shown in FIGS. 5-13 and described above is merely exemplary of the many systems which might be employed with the present invention. Depending upon the permissible cost and complexity, other known systems might also be used. In addition to the system described above, for example, it is possible to employ any one of the following systems:

1. A direction-finding system comprising a rapidly rotating (e.g., 3600 rpm) directional antenna and a timing system for determining the direction the antenna is pointing at the instant a pulse is received.

2. A direction-finding system comprising a fixed antenna array (e.g., a so-called "Adcock array") and an electronic coupling system whereby each antenna of the array is connected in turn to a receiver. Such an antenna is described in *Very High Frequency Techniques*, compiled by the staff of the Radio Research Laboratory, Harvard University; Boston Technical Publishers, Inc. (1965) pp. 264–271.

3. A direction-finding system comprising a horntype antenna and microwave circuitry for combining signals and signal phases received by the antenna to determine direction. See U.S. Pat. No. 3,568,203 issued Mar. 2, 1971 to D. Venters et al. and "Omni-Directional Instantaneous Direction-Finding System" by E. Chubb et al., IEEE Transactions on Aerospace and Electronic Systems (March, 1967) pp. 250–256. .

4. A direction-finding system comprising a plurality of directional antennae directed in different directions to cover all azimuthal sectors of the sky and an electronic switch connecting a receiver to that antenna from which the strongest signal is obtained. "Electronically Tracking Antenna System for Satellite Reception" by K. Kalliomaki et al. *IEEE Transactions on Aerospace and Electronic Systems* (May, 1970) pp. 405–407.

Figure 14:
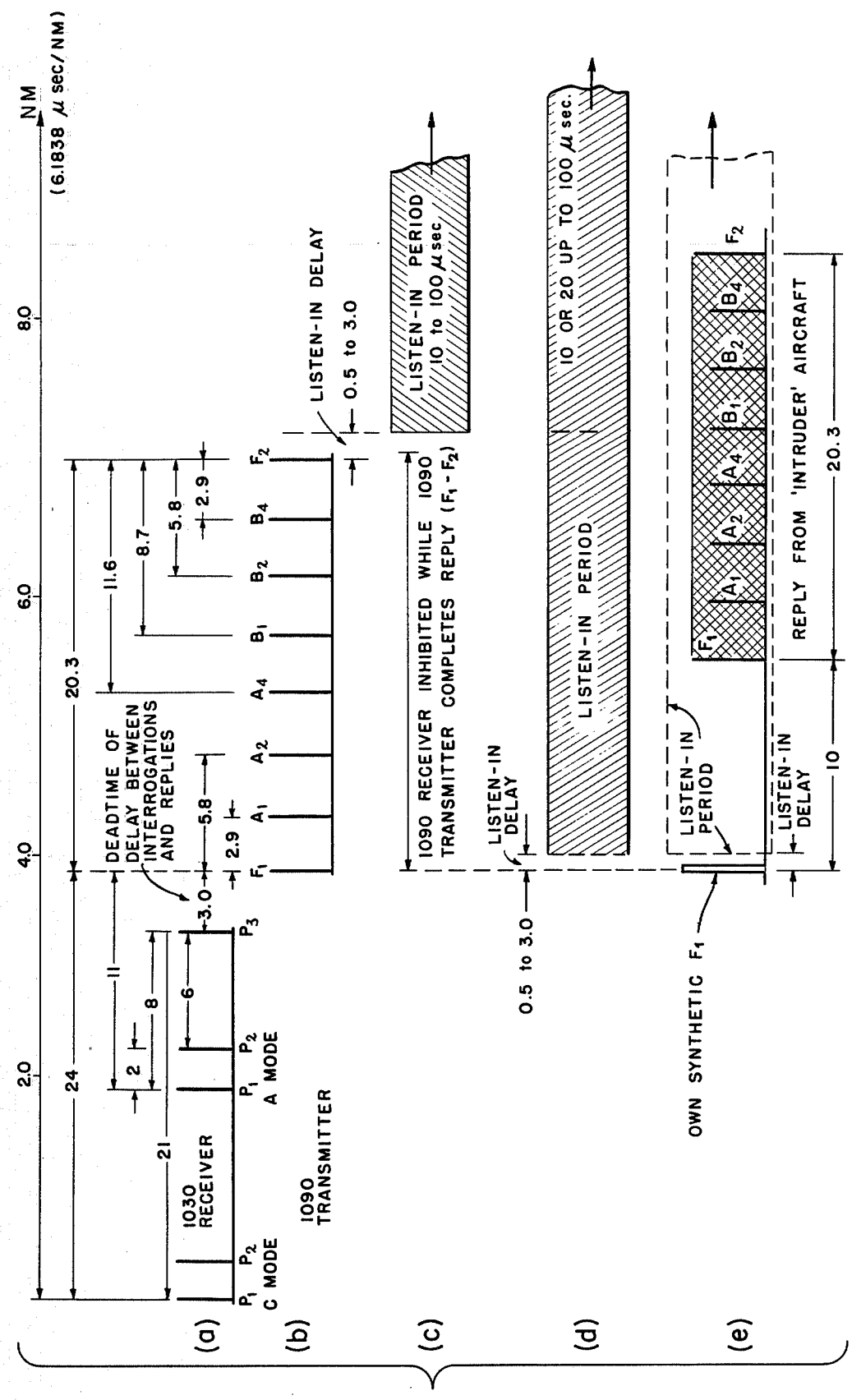
FIGS. 14a through 14e are graphical representations of transponder interrogations and replies, illustrating the operation and timing of the present invention.

FIG. 14 is a timing diagram illustrating how the present invention may be applied to the United States Air Traffic Control Radar Beacon System, which utilizes the same standard as the International Civil Aviation Organization Secondary Surveillance Radar System.

FIG. 14 (a) shows the interrogation messages that are transmitted at 1030 MHz by an SSR ground station. Normally, the ground station will interrogate alternately in the A mode with $P_1$ and $P_3$ pulses spaced $\epsilon$ μsec apart, and the C mode with $P_1$ and $P_3$ pulses spaced 21 μsec apart. In both modes a $P_2$ pulse is transmitted omni-directionally 2 μsec after the $P_1$ pulse for side lobe suppression (SLS) in the vicinity of the SSR antenna. Although previously only $P_2$ pulses were transmitted for SLS, many ground stations are now converting to the so-called "improved side lobe suppression" (ISLS) in which $P_1$ pulses as well as $P_2$ are transmited omni-directionally at the reduced SLS level.

FIG. 14 (b) shows the format of a transponder reply to either an A mode or a C mode iterrogation. Approximately 3 μsec after receipt of an interrogating $P_3$ pulse, transponder transmits a reply message at 1090 MHz. The reply message comprises 2 framing pulses, denoted $F_1$ and $F_2$, spaced 20.3 μsec apart. The interval between the framing pulses is divided into 12 subintervals, in each of which a pulse may or may not be transmitted. For clarity, only six such intervals denoting the positions of pulses $A_1$, $A_2$, $A_4$, $B_1$, $B_2$ and $B_4$ are shown in the figure.

When interrogated in the A mode, the transponder replies with an identity encoded in the 12 subintervals between the framing pulses. When the transponder is interrogated in the C mode, it replies with its altitude encoded in the 12 subintervals between the framing pulses.

FIG. 14 (c) shows the listen-in period for the embodiment of the invention illustrated in FIG. 2 and described above. After a short delay in the order of 0.5 to 3.0 μsec following completion of a reply, the 1090 MHz receiver is permitted to listen for replies from the transponders of intruder aircraft. Depending upon the size of the listen-in region desired, the listen-in period may extend from 10 to 100 μsec or more. In the embodiment of the invention illustrated in FIG. 2, the variable delay 44 controls the time of initiation of the listenin period, and the time-variable gage generator 42 controls the time of termination of the listen-in period.

As may be seen in FIG. 1, the sooner the own aircraft is able to listen for transponder replies of intruder aircraft, the closer to the own aircraft the inner ellipse and consequently the listen-in region will be. For example, if an intruder aircraft lies along the axis of an SSR beam which passes through the own aircraft, its existence may be detected at the own aircraft if it is sufficiently far away from the own aircraft so that an interrogation may travel from the ground station past the own aircraft to the intruder aircraft, and a reply to that interrogation may be transmitted from the intruder aircraft and received at the own aircraft after the listen-in period has begun. Clearly, the sooner the own aircraft begins to listen for transponder replies from intruder aircraft, the closer the detectable intruder aircraft may be.

FIG. 14 (d) shows a listen-in period which begins only 0.5 to 3.0 μsec after the own aircraft transponder would normally reply. Assuming a listen-in delay of 3.0 μsec, in the example above where the own aircraft and intruder aircraft lie on a common axis with the SSR beam, the one-way transmission time from one aircraft to the other must be greater than 1.5 μsec. Since radiation travels a distance of 1 NM in 6.1838 μsec, the own aircraft with such a listen-in delay could detect the presence of the intruder aircraft if the intruder aircraft were at least about ¼ NM away. Detection of intruder aircraft that are closer than ¼ NM may be unnecessary since, if such intruder aircraft were on a collision course with the own aircraft, it would have been detected earlier and evasive action taken.

Since it is not possible for the own aircraft to listen for transponder replies at 1090 MHz while transmitting its own reply at the same frequency, the listen-in period may be extended forward in time as shown in FIG. 14 (d) only when the transponder of the own aircraft is not required to reply.

Under the Radio Technical Commission for Aeronautics (RTCA) minimum operating characteristics standard, a transponder may fail to reply to up to 4½% of the received interrogations or up to 18 times per second. Accordingly when the own aircraft is within the SSR beam, a transponder may omit a reply, and the aircraft may listen during its own reply period, on a continuous basis of, say, ten times per second. when the own aircraft is outside the rotating beam (i.e., on either side of the beam yet adjacent to it), it can listen to transponder replies from intruder aircraft starting from the time that it would be interrogated if it were within the beam.

In order for the own aircraft to signal the start of an early listen-in period as shown in FIG. 14 (d) it must generate its own "synthetic $F_1$ 38 pulse which occurs at the time that its transponder would produce a true $F_1$ pulse were the own aircraft within the SSR beam. There are essentially two different techniques for generating a synthetic $F_1$ pulse, both of which are described in detail in my co-pending U.S. Pat. application Ser. No. 180,578, filed Sept. 15, 1971, referred to above. As described in connection with FIG. 5 of that application, these two techniques are:

1. When the aircraft is within the SLS coverage area of the SSR ground station, the omni-directionally transmitted $P_2$ pulse (or $P_1$ $P_2$ pulses with ISLS) are used to maintain the phase of a phase-locked generator operating at the pulse repetition frequency (PRF) of the SSR ground station.

2. When the aircraft is outside the SLS coverage area of a given SSR ground station, the burst of about 20 true $F_1$ pulses which occur during the dwell time of the SSR beam of that specific station are used to adjust the phase of the phase-locked PRF generator once during each beam rotation. The PRF generator is designed to maintain its adjustment between bursts.

It should be noted that each SSR ground station within line of sight of an aircraft (in this case, the own aircraft) has a separate, unique pulse repetititon frequency (PRF) and pulse repetition period (PRP)— the inverse of PRF. The SSR PRF's fall in the range of about 200 Hz to 450 Hz, separated by intervals of 4 or 5 Hz so that about 50 separate PRF's are available for use by ground stations.

FIG. 14 (e) shows a typical situation where a synthetic $F_1$ pulse is generated and followed, after a short listen-in delay, by a listen-in period. 10 μ sec after the synthetic $F_1$ pulse is produced a typical transponder reply is indicated as being received from the intruder aircraft.

Figure 15:
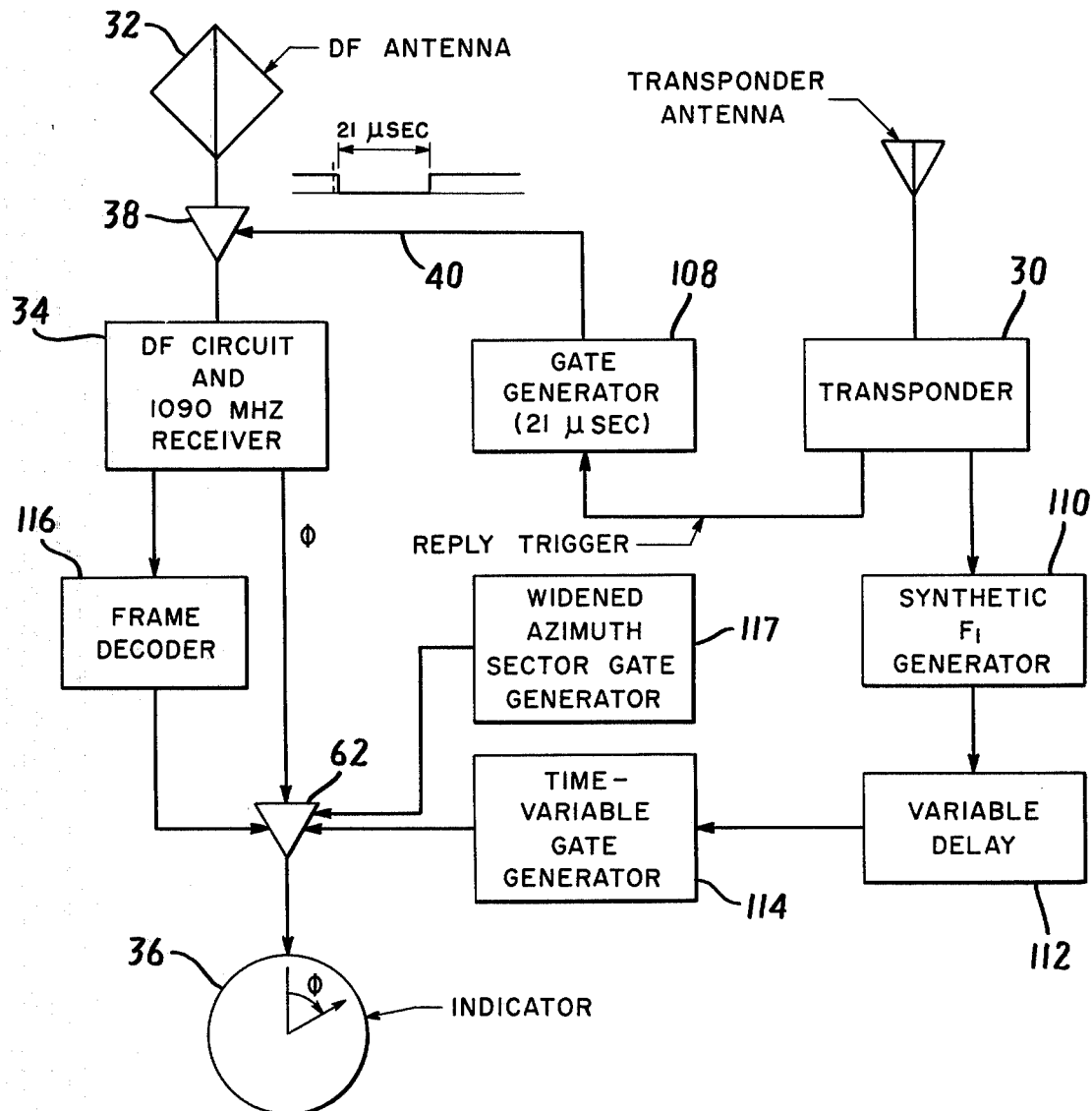
FIG. 15 is a block diagram of another preferred embodiment of the present invention.

FIG. 15 shows apparatus having a direction-finding system which may be used to listen-in on transponder replies from intruder aircraft when the own aircraft is both within and without the SSR beam. As in the embodiment of FIG. 2, this apparatus includes a direction-finding circuit and 1090 MHz receiver 34, and a bearing indicator 36. In addition, this apparatus includes a gate 38 for controlling passage of signals from the direction-finding antenna 32 to the receiver 34 and a gate 62 for controlling passage of the angle φ from the receiver 34 to the indicator 36.

The apparatus of FIG. 15 also includes a 21 μsec gate generator 108 connected to receive a reply-trigger pulse from the transponder 30 and apply an inhibiting signal to the gate 38 for 21 μsec thereafter. Thus, whenever the transponder 30 replies to an interrogation, the energy received by the direction-finding antenna 32 will not be passed to the receiver 34.

The apparatus of FIG. 15 also includes a synthetic $F_1$ pulse generator 110 which may be of the type shown in FIG. 5 of my co-pending application Ser. No. 180,578, filed Sept. 15, 1971 and referred to above. This generator continuously produces a synthetic $F_1$ pulse whether the transponder 30 is replying to an interrogation or not. The synthetic $F_1$ pulse is passed to a variable delay element 112 which produces an output pulse that determines the start of the listen-in period. For example, the variable delay 112 may introduce a delay of 0.5 to 3.0 $\mu$sec as the listen-in delay, or may introduce a larger delay before the start of the listen-in period.

The delay pulse from the variable delay 112 is passed to a time-variable gate generator 114 of the type shown in FIG. 4. This gate generator outputs a gating pulse for an adjustable period upon receiving a pulse from the variable delay. This gating pulse, which defines the listen-in period, opens the gate 62 to permit indication of the bearing $\phi$ of transponder replies received from any intruder aircraft.

The apparatus of FIG. 15 is also provided with a frame decoder 116 which produces an output pulse upon receipt of two framing pulses spaced 20.3 $\mu$sec apart. This frame decoder also opens the gate 62 to permit indication of a bearing whenever a true transponder reply is received. This frame decoder is well-known in the art and is disclosed, for example, in FIG. 9 of my co-pending application Ser. No. 130,952, filed Apr. 5, 1971, referred to above.

In operation, the apparatus of FIG. 15 provides an indication of bearing angle whenever a reply is received from the transponder of an intruder aircraft that is flying within the entire region between the inner ellipse and the outer ellipse as shown in FIG. 1. Obviously, such a large listen-in region is not necessary or desirable for the purposes of the present invention; rather, the listen-in region should be limited to the area between the inner and outer ellipse within the proximity of the own aircraft. Apparatus for so limiting the listening region is shown and described in my co-pending application Ser. No. 130,952, filed Apr. 5, 1971 and referred to above. This apparatus, which is indicated in FIG. 15 as gate generator 117, limits the gated listen-in period to a selected widened azimuth sector about the axis between the SSR ground station and the own aircraft. It will be understood that the application of such apparatus to the embodiment of FIG. 15 as well as to other embodiments of the present invention will fall within the scope of the present invention.

In the embodiment of the invention described above in connection with FIGS. 2, 3, and 15, only the bearing and altitude of intruder aircraft are precisely determined and indicated. The range of the intruder aircraft is known only approximately, since the intruder aircraft can lie anywhere within the gated listen-in region. In the apparatus to be described hereinbelow in connection with FIGS. 18, 22 and 23, means are provided for also determining the slant range of the intruder aircraft.

Figure 16:
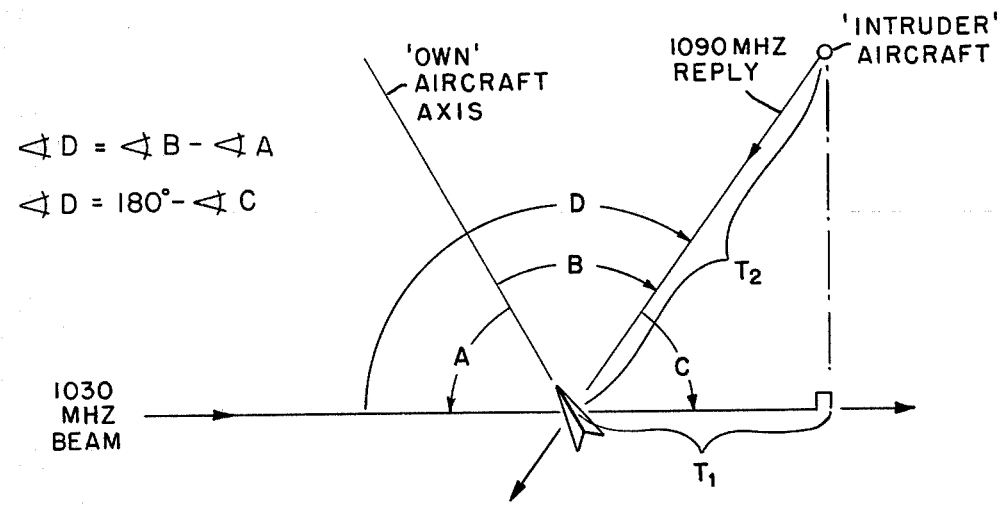
FIG. 16 is a geometrical diagram showing a secondary surveillance radar beam and two aircraft in typical positional relationship, and showing certain distances and angles which are defined for the purposes of the present invention.
Figure 18:
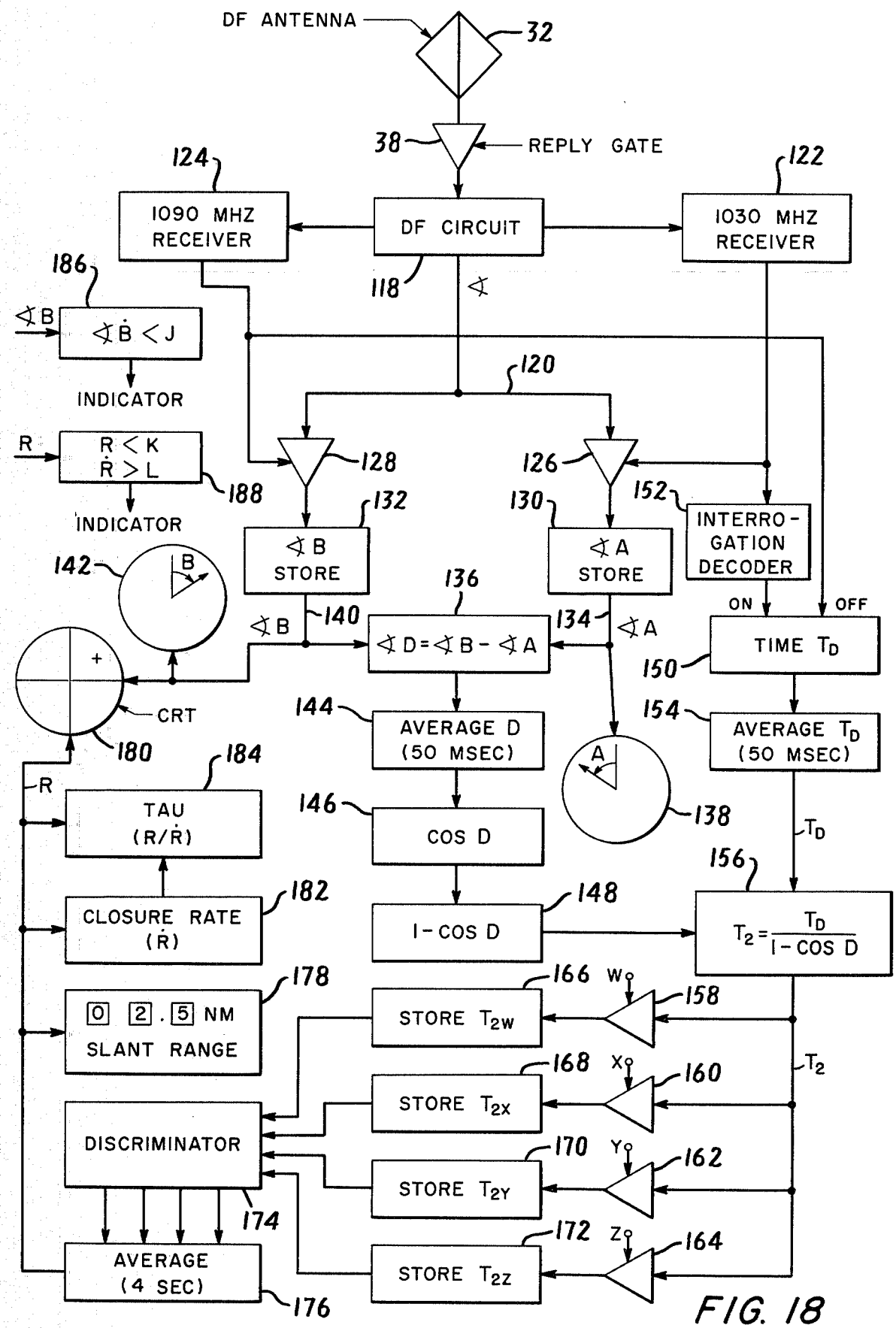
FIG. 18 is a block diagram of another preferred embodiment of the present invention.

FIG. 16 depicts the various parameters which will be used in the apparatus of FIG. 18 to determine the slant range (R) of an intruder aircraft from the own aircraft. As illustrated, there is defined an angle A taken from the own aircraft axis to the axis of the SSR beam when the beam passes through the own aircraft; an angle B taken from the own aircraft axis to a line drawn between the intruder aircraft and the own aircraft; and an angle C taken from the line drawn between the intruder aircraft and the own aircraft to the axis of the SSR beam. In addition, there is defined an angle D which is taken from the axis of the SSR beam to the line drawn between the intruder aircraft and the own aircraft. As indicated, the angle D is equal to the sum of the angle B and the angle A, when an angle A is taken in the opposite direction. Thus, $$D = B - A \tag{1}$$

In addition, it may be seen that angle D plus angle C equals 180°. Consequently:

$$D = 180° - C \tag{2}$$

FIG. 16 also defines two time periods which will be used with the apparatus of FIG. 18. The first of these periods $T_1$ is the difference in time between the receipt of an interrogation by the own aircraft and the receipt of that same interrogation by the intruder aircraft. The second period $T_2$ is the time of transmission from the intruder aircraft to the own aircraft.

Figure 17:
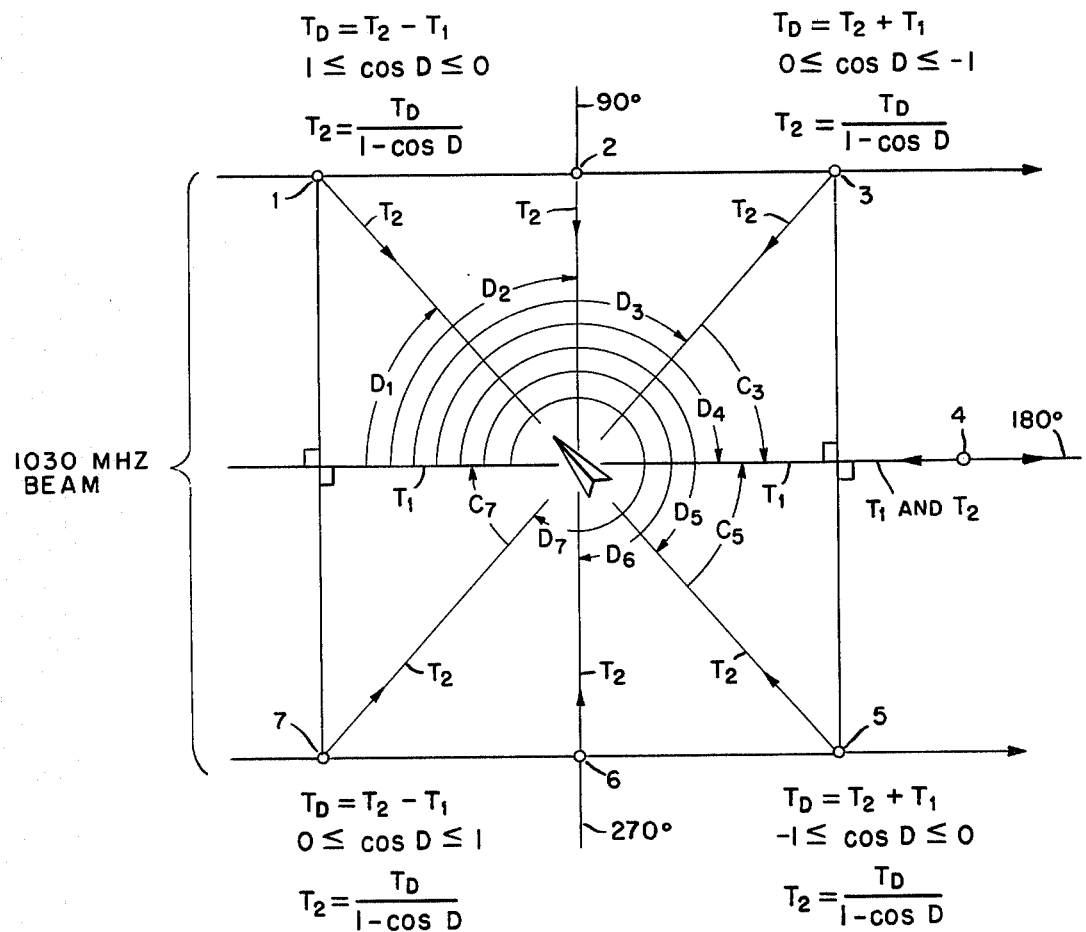
FIG. 17 is a geometrical diagram similar to FIG. 16, showing distances and angles for various relative positions of the two aircraft.

FIG. 17 illustrates seven different positions in which a detectable intruder aircraft may be located with respect to the own aircraft, and indicates the parameters D, $T_1$ and $T_2$ for each position.

When the intruder aircraft is in position 1 its associated angle D, indicated as $D_1$ in FIG. 17, lies between 0° and 90°. At position 2, $D_2$ equals 90°; at position 3, $D_3$ lies between 90° and 180°; at position 4, $D_4$ equals 180°; at position 5, $D_5$ lies between 180° and 270°; at position 6, $D_6$ equals 270°; and at position 7, $D_7$ lies between 270° and 360°.

For clarity $T_1$ and $T_2$ are indicated as being identical for positions, 1, 3, 5 and 7 and $T_2$ is indicated as being identical for positions 2 and 6. Obviously, no such limitation is intended since the slant range of the intruder aircraft from the own aircraft is variable. The only constraint or assumption taken in the geometry of FIG. 17 is that the own aircraft and the intruder aircraft are sufficiently far away from the SSR ground station that the 1030 MHz SSR beam forms plane parallel waves. This is a good assumption when the own aircraft is in excess of 10 or 15 miles from the SSR ground station and the intruder is within five miles of the own aircraft.

The embodiment of the invention shown in FIG. 18 is based upon the measurement of angles A and B, from which an angle D may be determined, and based on the measurement of the difference in time ($T_D$) between the receipt of an interrogation at the own aircraft and the receipt of a reply to that same interrogation from an intruder aircraft.

As shown in FIG. 17 this value $T_D = T_2 - T_1$ when the intruder aircraft is located at positions 1 or 7; $T_D = T_2 + T_1$ when the intruder aircraft is located at positions 3, 4, or 5; and $T_D = T_2$ when the intruder aircraft is located at positions 2 and 6.

From geometrical relationships illustrated in the figure, it may be readily shown that the time $T_2$ for transmission of a reply from an intruder aircraft to the own aircraft is given, in terms of the time differnce $T_D$ and the angle D, by the following formula:

$$T_2 = T_D/(1-\cos D) \tag{3}$$

This formula holds, no matter what the relative position of the intruder aircraft may be to the own aircraft, except in the case where D is zero or extremely close to zero. This case, in which the intruder aircraft lies on a direct line between the own aircraft and the SSR ground station, it excluded by the finite listen-in delay or inner ellipse.

In particular, when the intruder aircraft is in position 1, $T_D = T_2 - T_1$ and $\cos D = T_1/T_2$. The relationship (3) given above for $T_2$ may be shown by substituting the value $T_2 - T_D$ for $T_1$ in the formula for $\cos D$.

When the intruder aircraft is in position 2, $\cos D$ is 0 and $T_2 = T_D$.

When the intruder aircraft is in position 3, $T_D = T_2 + T_1$ and $\cos C_3 = T_1/T_2$. Substituting $T_D - T_2$ for $T_1$ in the formula for $\cos C_3$, we obtain $$\cos C_3 = (T_D - T_2)/T_2$$
$$T_2 \cos C_3 = T_D - T_2$$
$$T_2 + T_2 \cos C_3 = T_D$$
$$T_2 = T_D /(1 + \cos C_3)$$

Since $D_3 = 180° - C_3$, $\cos C_3 = - \cos D_3$ and the formula follows the relationship (3) given above for $T_2$.

When the intruder aircraft is in position 4, $\cos D = -1$ so that $T_2 = T_D /2$.

When the intruder aircraft is in position 5, the procedure for determining $T_2$ follows the discussion above for the case where the intruder aircraft is in position 3. In this instance, $D_5 = 180° - (-C_5)$, since $C_5$ is taken in the direction opposite to the direction of $D_5$.

When the intruder aircraft is in position 6, $\cos D = 0$ and $T_2 = T_D$.

When the intruder aircraft is in position 7, $T_D = T_2 - T_1$ and $\cos C_7 = T_1/T_2$. Substituting $T_2 - T_D$ for $T_1$ in the cosine equation we obtain $\cos C_7 = (T_2 - T_D)/T_2$; or $T_2 = T_D /(1 - \cos C_7)$ Since $\cos C_7 = \cos D_7$, the equation for $T_2$ follows the relationship (3) set forth above.

FIG. 18 shows apparatus for passively determining the slant range R of an intruder aircraft from the relationship (3) for $T_2$ given above. Like the embodiment of FIG. 2, this apparatus is intended to indicate the presence of intruder aircraft which lie within the gated listen-in region illustrated in FIG. 1. This apparatus may, of course, be modified in the manner discussed above in connection with FIG. 15 to indicate the presence of aircraft within a widened azimuth sector.

The apparatus of FIG. 18 includes a direction-finding antenna 32 and the usual gate 38 for inhibiting transmission of signals received by the direction-finding antenna during reply by the own aircraft transponder. A direction-finding circuit 118 determines the angle of incidence of radiation impinging on the direction-finding antenna 32 and outputs a signal on line 120 representing this angle. In addition, the direction-finding circuit 118 is associated with 2 receivers: a first receiver 122 tuned to receive pulses at 1030MHz and a second receiver 124 tuned to receiver pulses at 1090 MHz. The pulses received by these first and second receivers are applied to gates 126 and 128, respectively. These gates pass the signal denoting the angle of the incoming pulses to amplitude storage elements 130 and 132, respectively. As may be seen in FIG. 16, the direction-finding system determines the angle A upon receipt of an interrogation from the SSR ground station at 1030 MHz and determines the angle B upon receipt of a transponder reply at 1090 MHz.

The angle A appearing on line 134 is passed to a logic element 136 and may also be displayed, if desired, by an indicator 138. The angle B appearing on line 140 is passed to the logic element 136 and may also be displayed, if desired, by an indicator 142. The logic element 136 subtracts the signal representing the angle A from the signal representing the angle B to produce a signal representing the angle D. It should be noted, in this regard, that since the angles A and B are taken in opposite directions (the angle A being counterclockwise and the angle B being clockwise), one of these two angles will be represented by a positive signal and the other by a negative signal on lines 134 and 140.

The angle D determined by the logic element 136 is averaged over the dwell time of the SSR beam at the own aircraft, or approximately 50 msec, by an integrating element 144. Thus, the element 144 produces a signal representing the angle D which is an average of about 20 samples. This signal is supplied to a cosine generator 146 which, in turn, supplies a signal representing the cosine of the angle D to a logic element 148 that produces a signal representing the difference: $1 - \cos D$.

The time $T_D$ is measured by a ramp generator 150 which is turned on upon receipt of the $P_3$ pulse of a 1030 MHz interrogation and turned off upon receipt of the first framing pulse $F_1$ of a transponder reply at 1090 MHz. A decoder 152, which may be similar in structure to the frame decoder 116 of the apparatus of FIG. 15, supplies a pulse to the ramp generator 150 upon receipt of both $P_1$ and $P_3$ pulses spaced either 8 μsec (A mode) or 21 μsec (C mode) apart. This pulse clears the ramp generator to zero or a nominal internal voltage and starts the generator so that this internal voltage rises linearly until the generator is switched off.

The first reply pulse received from the 1090 MHz receiver 124 and supplied to the ramp generator 150 switches the generator off and gates its internal voltage out to an integrating element 154. Like the element 144, the element 154 averages the various voltages received over the SSR beam dwell period or approximately 50 msec. This average, which represents the time $T_D$, is then applied to a logic element 156 that divides the time $T_D$ by the factor $(1 - \cos D)$ to produce a signal representing the value of time $T_2$.

The value $T_2$, which is the time of transmission of radiation from the intruder aircraft to the own aircraft, is a direct measure of the slant range of the intruder aircraft from the own aircraft. In particular, since radiation travels 1 NM in 6.1838 μsec:

$$T_2 = 6.1838 \times R \quad (4)$$

Although the value $T_2$ may be applied directly to an indicator to display slant range, in this preferred embodiment of the present invention a plurality of values $T_2$ are averaged over the period of rotation of an SSR beam or approximately 4 seconds. In this way, if the own aircraft is being interrogated by more than one SSR beam, the values $T_2$ obtained by interrogations of all the beams may be considered in the determination of slant range.

Accordingly, the output of the logic element 156 is supplied to a plurality of gates 158, 160, 162 and 164 which are successively activated to pass the value $T_2$ to a corresponding storage element 166, 168, 170 and 172. The storage elements are designed to store a voltage only temporarily, so that if they receive no input voltage within an approximately 5 second interval they will produce a zero output.

The outputs of the storage elements 166–172 are passed through a discriminator 174 which will be described in detail hereinbelow. The discriminator is designed to eliminate those values $T_2$ which are not close to the remaining values thereof. The discriminator thus prevents erronous measurements from biasing the average.

If the values $T_2$ succeed in passing through the discriminator they are applied to a parallel averaging circuit 176 which averages together all the non-zero voltages. If a zero voltage is applied to one of the inputs of the averaging circuit, either because a storage element 166–172 produced a zero output or because a non-zero voltage failed to pass through the discriminator 174, this zero voltage is not included in the average.

The output of the averaging circuit 176 is a voltage of magnitude which is directly proportional to the slant range R. This voltage may be displayed directly as slant range alone by an indicator 178 and/or may be applied to an indicator, such as a cathode ray tube 180, which can display both range and bearing simultaneously. In addition, the range voltage may be applied to a differentiator 182 to determine the closure rate between the intruder aircraft and the own aircraft. Finally, the value of "tau," which is a factor of both the range and the closure rate and is a measure of the danger of collision, may also be determined by a dividing logic element 184.

Since not all the range and bearing determinations of intruder aircraft may be of interest to the operator of the own aircraft, it is also possible to enable indication of an intruder aircraft only if either its bearing rate, range and/or range rate fall within prescribed limits. For example, with a comparison element 186 it is possible to enable the indication of range and bearing, and to send a proximity warping signal to the ground controller, if the rate of change of the bearing angle B is less than a presecribed minimum J. Similarly, with a comparison element 188 it is possible to enable the indication of range and bearing, and to alert the ground controller, if the range is less than a value K and/or the range rate is greater than a value L. The values of J, K and L may be set into the comparison elements 186 and 188, for example, by means of manual code wheel switches.

Figure 19:
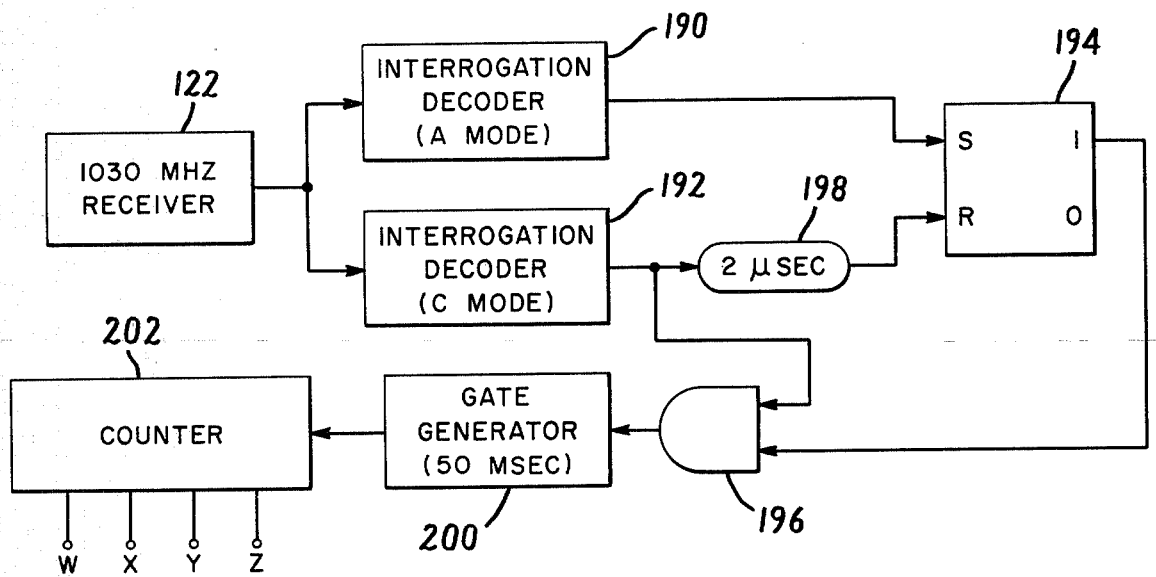
FIG. 19 is a block diagram of a cycling device which may be used with the embodiment of FIG. 18.

FIG. 19 illustrates a preferred embodiment of apparatus which may be used to successively apply a gating pulse to the gates 158, 160, 162 and 164 of the apparatus of FIG. 18. With this apparatus, if two successive SSR ground station interrogations are decoded, a gating pulse will be applied to the next successive gate and maintained for the dwell period of the SSR beam.

In the apparatus of FIG. 19, pulses received from the 1030 MHz receiver 122 are applied to an A mode decoder 190 and a C mode decoder 192. If an A mode interrogation is decoded, a flip flop 194 is set and a 1 signal is applied to an AND-gate 196. If a C mode interrogation is decoded, a pulse is applied to the other input of the AND-gate 196. After a 2 $\mu$sec delay inserted by the delay element 198, the flip-flop 194 is reset.

If the flip-flop 194 has been set by an A mode interrogation when a C mode interrogation is received, a pulse is applied by an AND-gate 196 to a gate generator 200. This gate generator then supplies a 50 msec pulse to a counter 202, indexing its count so that a 1 signal appears on the next successive one of the outputs labeled W, X, Y and Z. So long as an output signal is presented by the gate generator to the counter, the count will not be indexed so that, at a minimum, the count will be indexed only every 50 msec. This arrangement permits the $T_2$ values obtained during an entire beam dwell to be stored in a single one of the storage elements 166–172.

Figure 20:
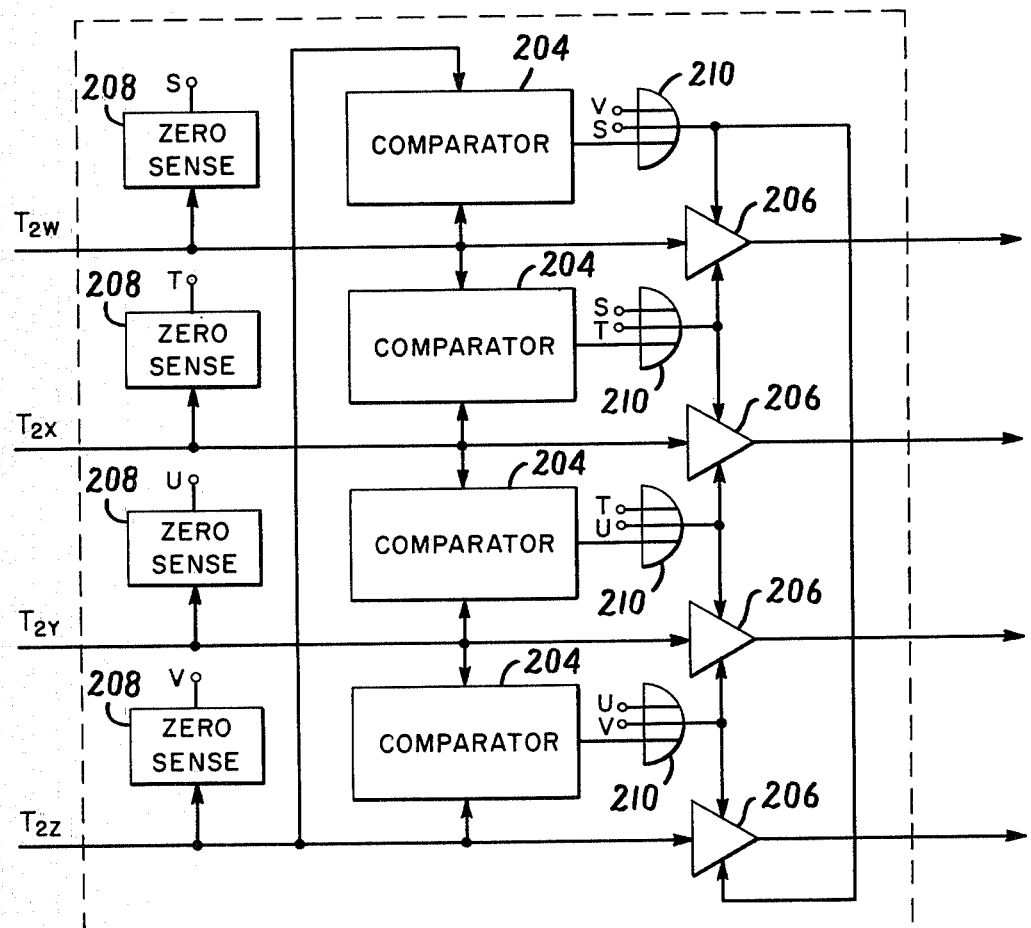
FIG. 20 is a block diagram of a discriminator which may be used with the embodiment of FIG. 18.

FIG. 20 shows a simple discriminator which may be used as element 174 in the apparatus of FIG. 18. In this discriminator adjacent pairs of $T_2$ values are compared, and if they fall outside the limits of comparison these values are not passed on to the averaging element 176. If one or more of the $T_2$ values are zero, the comparison is not permitted to influence the decision as to whether an adjacent $T_2$ value will be passed to the averaging element.

More particularly, the apparatus of FIG. 20 includes a plurality of comparators 204 connected to receive adjacent pairs of signals from the inputs $T_{2W}$, $T_{2X}$, $T_{2Y}$ and $T_{2Z}$. If the two values of $T_2$ applied to a comparator are sufficiently close to fall within the limits of comparison, the comparator produces an output signal which is ultimately applied to a pair of gates 206 permitting the corresponding pair of $T_2$ values to be passed to the averaging element 176.

A plurality of zero-sensing elements 208 sense whether any of the $T_2$ values is equal to zero. If a zero value is sensed, a signal is applied to the appropriate OR-gates 210 so that an adverse comparison between two values of $T_2$, one of which is a zero value, will not prevent the other value from being passed to the averaging element 176.

Figure 21:
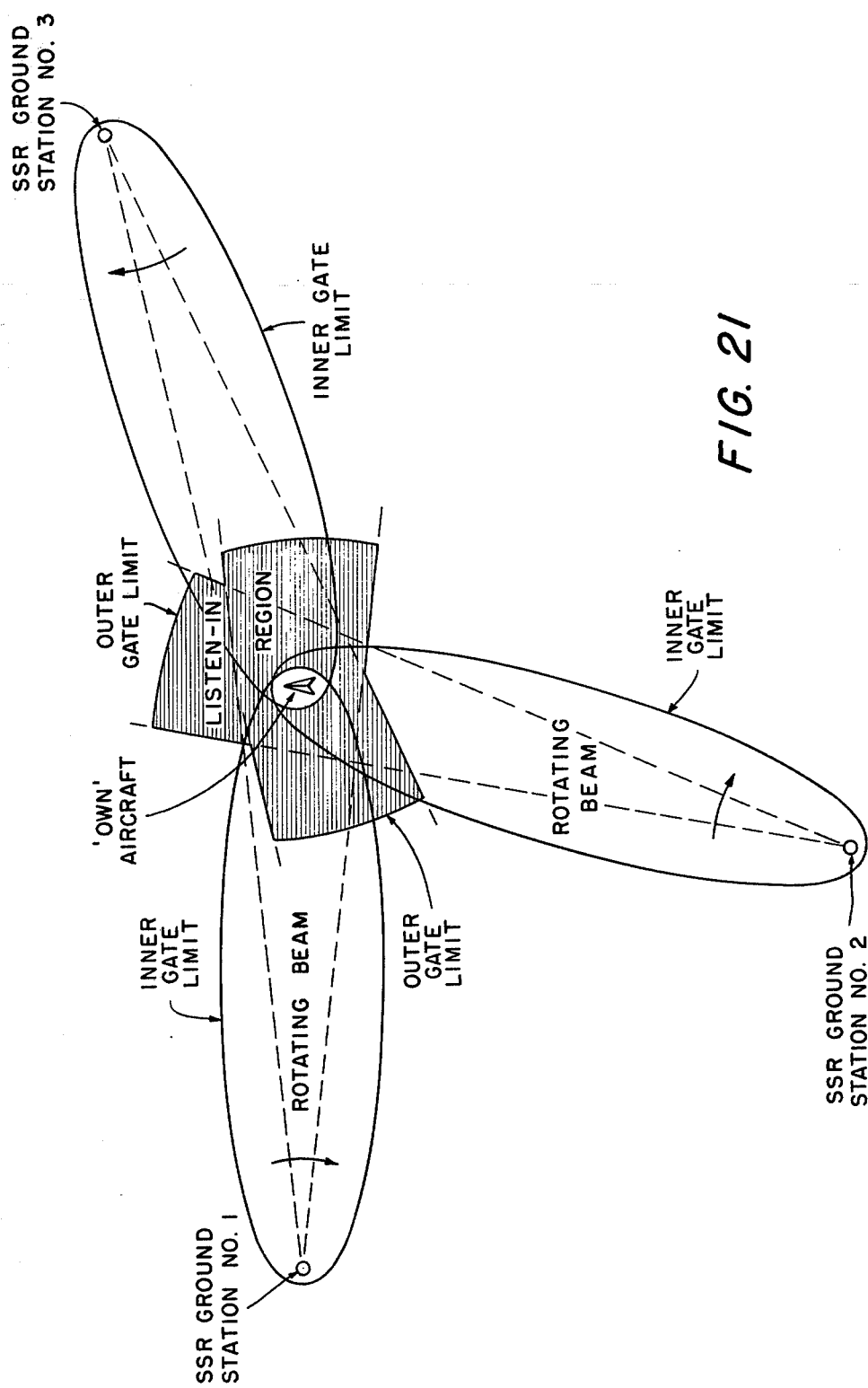
FIG. 21 is a geometrical diagram showing the proximity warning detection region available to an aircraft situated within range of the beams of three secondary surveillance radar ground stations.

FIG. 21 is a geometrical diagram, similar to FIG. 1, showing the effect on the listen-in region when an aircraft is interrogated by more than one SSR beam. As may be seen, three SSR beams are sufficient to completely surround the own aircraft with a listen-in region so that no intruder aircraft in the vicinity of that aircraft can escape detection.

Particularly along the eastern seaboard of the continental United States, each aircraft in the sky is interrogated by at least three SSR beams transmitted by randomly located SSR ground stations. However, in other parts of the world, particularly over the poles and oceans, an aircraft may be interrogated by only one SSR beam if it is interrogated at all. Since in such cases it is not possible for the own aircraft to detect the pressure of intruder aircraft entirely passively in the entire, immediately surrounding region of the sky, other means must be provided to detect the presence of intruder aircraft. Two embodiments of such means are shown in FIGS. 22 and 23.

Particularly in areas in which SSR ground stations are few and far between, it is possible to transmit on either the 1030 MHz interrogation frequency or the 1090 MHz reply frequency without interfering with the SSR system. Since such a transmission cannot be correlated with the interrogations and replies sent from and received by the SSR ground stations, these ground stations cannot "hear" the additional transmitted radiation.

Figure 22:
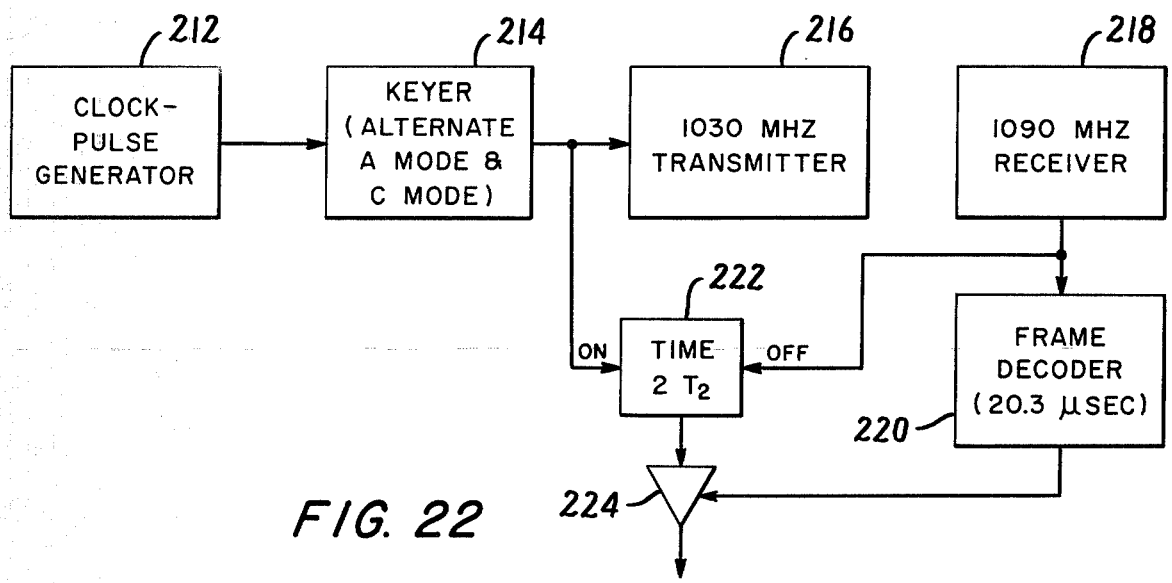
FIG. 22 is a block diagram of range-determining apparatus which may be used with the embodiment of FIG. 18, or with any other embodiment of the present invention.
Figure 23:
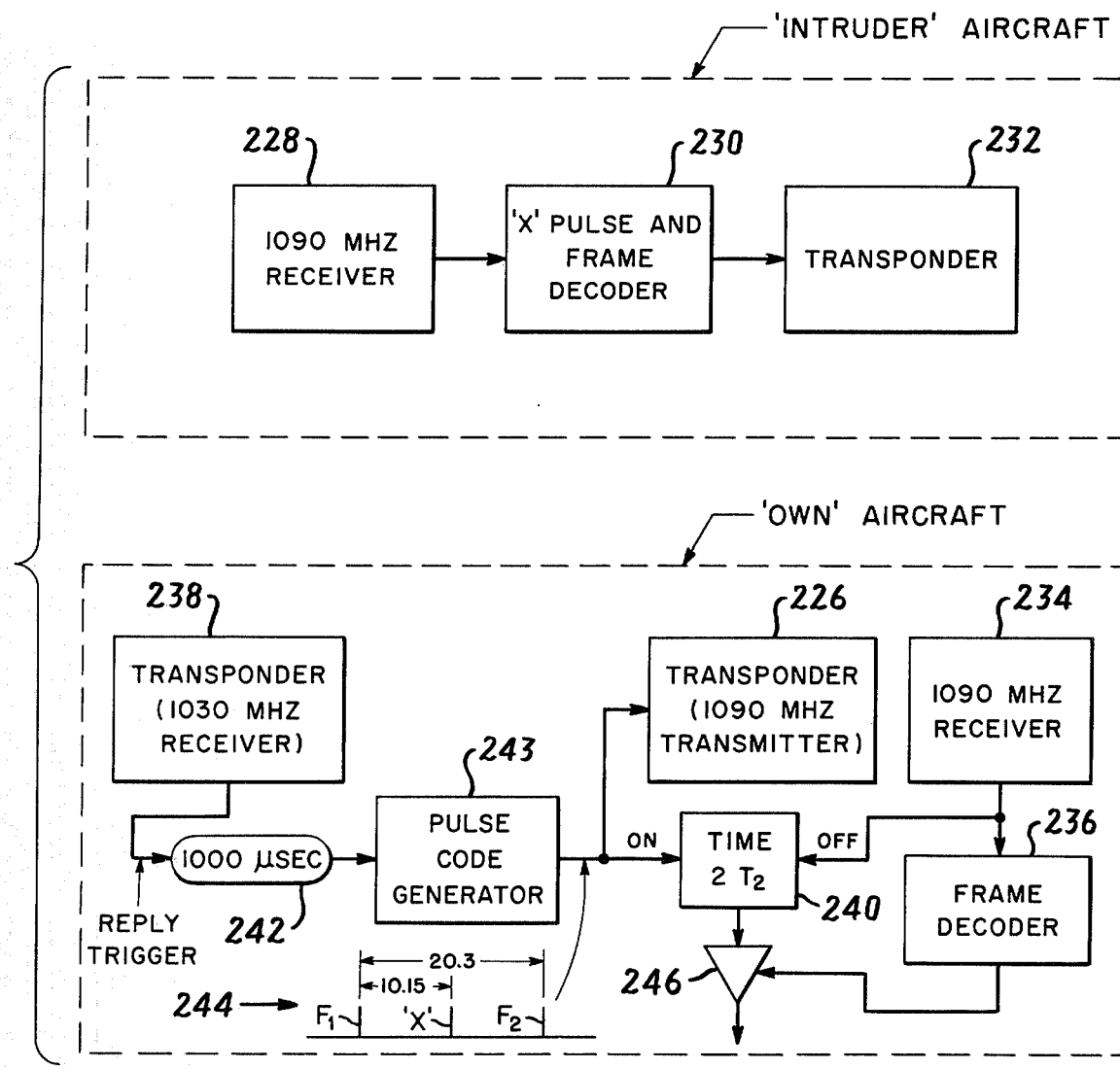
FIG. 23 is a block diagram of alternative range-determining apparatus which may be used with the embodiment of FIG. 18, or with any other embodiment of the present invention.

FIG. 22 shows apparatus for transmitting interrogations at 1030 MHz and receiving replies from nearby aircraft. This apparatus comprises a clock-pulse generator 212 which may be turned on at will to apply pulses at a rate of, say, 10 pulses per second to a keying element 214. The keyer 214 produces $P_1$ and $P_3$ pulses, alternately with A mode and C mode separation, upon receipt of each clock pulse. The $P_1$ and $P_3$ pulses are supplied to a 1030 MHz transmitter 216 of relatively low power which transmits interrogations to all nearby aircraft. Replies to these interrogations are received by a 1090 MHz receiver 218 and decoded by a 20.3 μsec frame decoder 220.

Each time a $P_1$ or $P_3$ pulse is applied to the 1030 MHz transmitter 216, it is also applied to reset and turn on a ramp generator 222. Following transmission of the $P_3$ pulse, the receipt of the first framing pulse of a reply turns off the ramp generator 222. The ramp generator thus produces a voltage representing twice the time of transmission from a replying intruder aircraft to the own aircraft. This voltage is gated out for use as the slant range by a gate 224 if a reply frame is, in fact, decoded by the decoder 220.

The apparatus of FIG. 22 requires no cooperating apparatus in the intruder aircraft. The transponders of the intruder aircraft merely reply to the 1030 MHz interrogations transmitted by the own aircraft in the normal manner. If transmissions at 1090 MHz are to be sent by the own aircraft, however, the intruder aircraft must be provided with a 1090 MHz receiver as well as means for determining that a reply is required. Such a system is shown in FIG. 23.

The apparatus of FIG. 23 comprises, at the own aircraft, a 1090 MHz transmitter 226 which is keyed at any convenient time; for example, 1000 μsec after receipt of each beam interrogation. The 1090 MHz transmitter may also be keyed periodically, independent of beam interrogations, by a clock-pulse generator of the type shown in FIG. 22.

In the particular embodiment illustrated in FIG. 23, the 1090 MHz transmitter transmits two framing pulses spaced 20.3 μsec apart in time and a so-called "X" pulse spaced midway between the framing pulses. Obviously any other unique and identifiable pulse combination could serve equally well. This pulse combination, whatever it may be, is received and decoded at a nearby intruder aircraft and used in the manner of an interrogation to trigger that aircraft's transponder.

Thus, at a minimum, the intruder aircraft must carry a 1090 MHz receiver 228, and possibly a decoder 230, in addition to its own conventional transponder 232.

Replies from the intruder aircraft's transponder 232 are received at the own aircraft by a 1090 MHz receiver 234 and decoded by the usual frame decoder 236. Reply trigger pulses produced by the transponder 238 of the own aircraft are applied through the appropriate delay 242 to a pulse code generator 243 which produces the appropriate pulse code, such as that indicated in FIG. 23 at 244. This pulse code generator may, for example, be the well known clock currently employed in conventional transponders to generate the proper code structure in response to an interrogation.

The pulses produced by the pulse code generator are applied to clear and turn on the ramp generator 240. The first $F_1$ pulse received in reply by the 1090 MHz receiver 234 is used to turn off the ramp generator 240 so that its ouput voltage will represent a value equal to twice the time of transmission from the intruder aircraft to the own aircraft. This voltage is subsequently gated out by an output gate 246 if a reply frame is decoded by the decoder 236.

It will be understood that the two types of active systems for determining slant range shown in FIGS. 22 and 23 may be used either independently or in combination. Preferably, these systems are combined with one or more of the systems described above for determining the bearing to an intruder aircraft so that both range and bearing may be observed.

Except under conditions where the interrogation rate is low, it is, of course, preferably to determine range and bearing entirely passively. Ideally, therefore, apparatus of the type shown in FIG. 18 should be used to passively determine both range and bearing, where this is possible. In areas where a passive range determination cannot be made, active range-determining apparatus of the type shown in FIGS. 22 and 23 may be used in conjunction with a direction-finding system to obtain the range and bearing information.

In the embodiment of the invention described above in connection with FIG. 18, a dual band direction-finding system is required to obtain a measurement of angle A (1030 MHz) and angle B (1090 MHz). If a North burst of pulses is transmitted by the SLS omni-directional antenna of an SSR ground station each time the beam is directed at magnetic North (MN) it is possible to measure the time it takes the beam to travel from the MN position to the line of position of the own aircraft and to thereby passively obtain the magnetic bearing of the own aircraft from the transmitting ground station. Such a system, which is described in my co-pending application Ser. No. 180,578, filed Sept. 15, 1971, and my co-pending application Ser. No. 371,839, filed June 20, 1973, referred to above, may be used in conjunction with the apparatus of FIG. 18 to determine the slant range to an intruder aircraft without a direct determination of the angle A. This system is potentially more accurate in its determination than a direction-finding system and may therefore be preferred.

Figure 24:
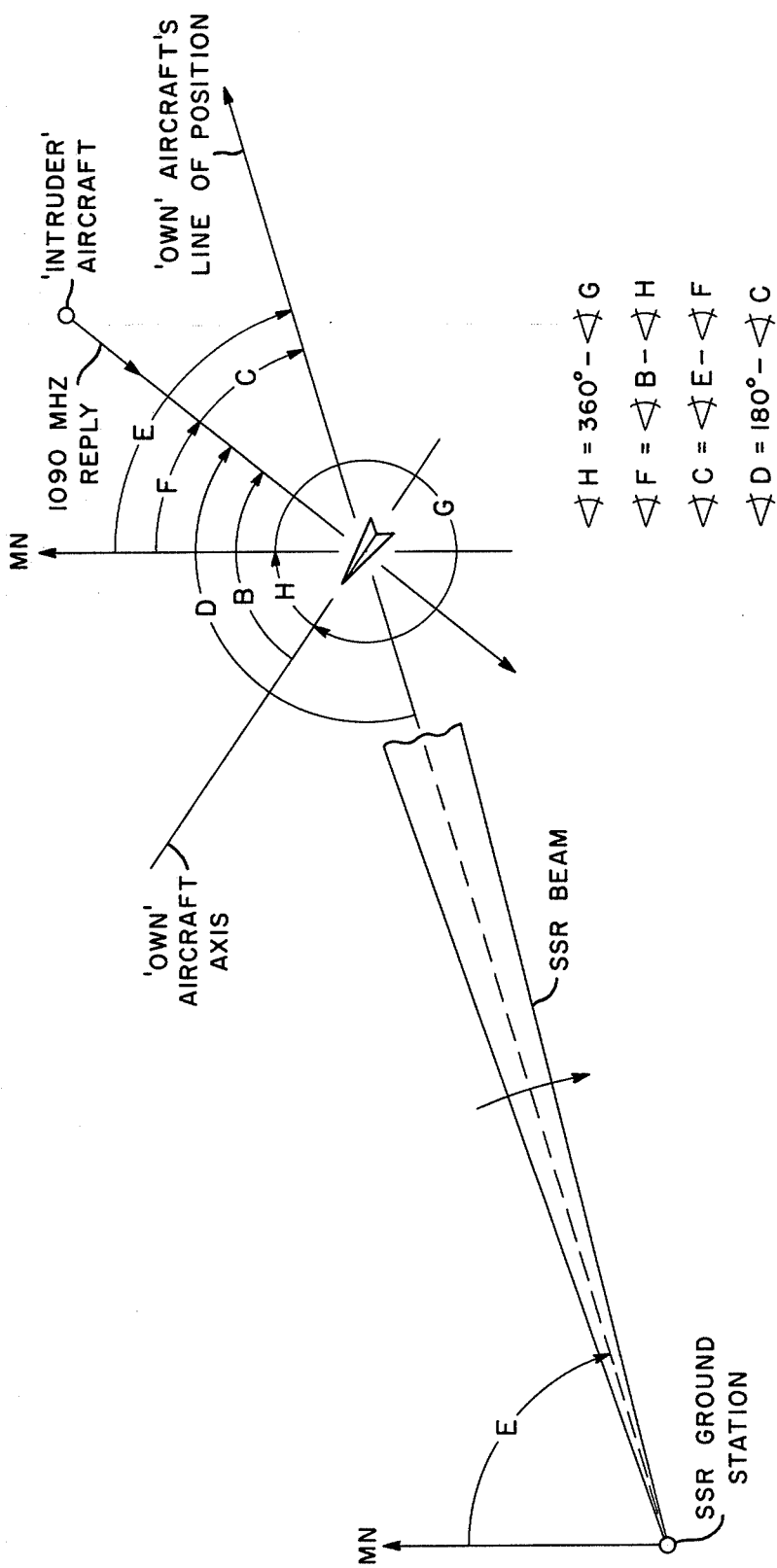
FIG. 24 is a geometrical diagram showing a secondary surveillance radar beam and two aircraft in typical positional relationship, and showing certain angles which are defined for the purposes of the present invention.
Figure 25:
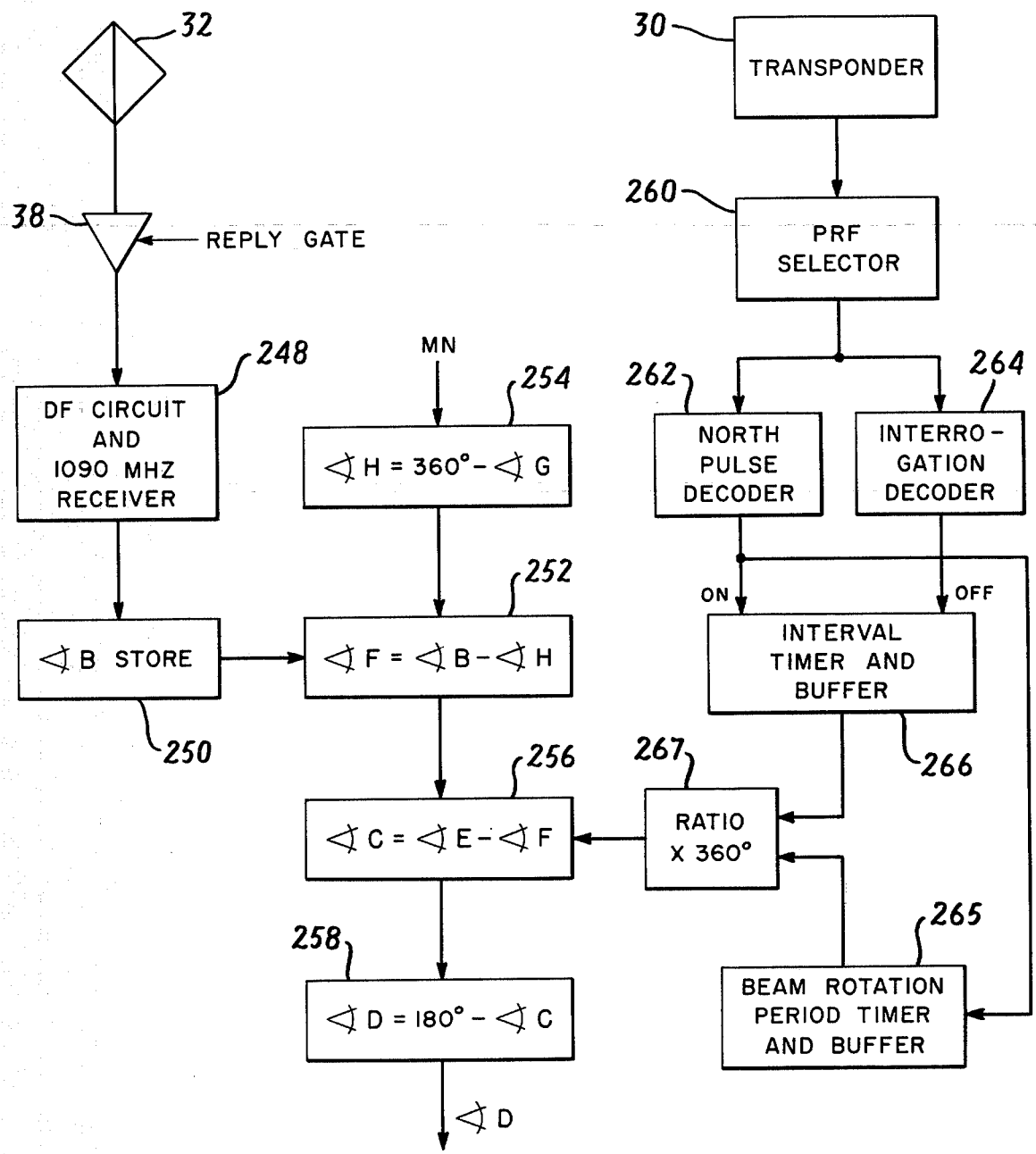
FIG. 25 is a block diagram of a modification of the apparatus of FIG. 18.

FIG. 24 depicts the various parameters which will be used in the apparatus of FIG. 25 to determine the angle D. As illustrated, there is defined an angle E taken from magnetic North to the own aircraft line of position from an interrogating SSR ground station; an angle F taken from magnetic North to a line drawn between the intruder aircraft and the own aircraft; an angle G taken from magnetic North to the own aircraft axis; and an angle H taken from the own aircraft axis to magnetic North. All of the above defined angles are defined in the clockwise direction. Angles B, C and D, which were defined above in connection with FIG. 16, are also shown in FIG. 24.

As may be appreciated from the geometry of the arrangement shown in FIG. 24, the angle G plug the angle H equals 360°, so that:

$$H = 360° - G \qquad (5)$$

In addition, it may be seen that:

$$F = B - H \qquad (6)$$

$$C = E - F \qquad (7)$$

Equation (2) is also applicable; that is:

$$D = 180° - C$$

The apparatus of FIG. 25 includes a direction-finding antenna 32 and the usual gate 38 for inhibiting transmission of signals received by the direction-finding antenna during reply by the own aircraft transponder 30. A direction-finding circuit and 1090 MHz receiver 248 determines the angle of transponder replies received by the antenna 32 from an intruder aircraft. A signal representing this angle is passed to a storage device 250 which continuously supplies the angle B to a logic element 252. This logic element also receives a signal representing the angle H from a logic element 254 and produces an output signal representing the angle F.

The logic element 254 subtracts the own aircraft magnetic heading G from 360° to produce the angle H. The signal MN representing the angle G is obtained from an on-board magnetic compass.

A logic element 256 receives the angle F from the logic element 252 as well as the angle E and produces a signal representing the angle C. This signal is passed to a logic element 258 which subtracts the angle C from 180° to produce a signal representing the angle D. This angle D may then be utilized in the apparatus of FIG. 18 to compute the slant range of the intruder aircraft.

The angle E, which is applied to the logic element 256, is determined by apparatus of the type disclosed in my co-pending application Ser. No. 180,578, filed Sept. 15, 1971, referred to above. This apparatus includes a conventional transponder 30, a pulse repetition frequency (PRF) selector 260, a North pulse decoder 262, an interrogation decoder 264, interval timers and buffers 265 and 266, and a logic element 267. A timer and buffer which may be used in this apparatus is shown in FIG. 6 of said co-pending application Ser. No. 180,578.

In operation, the apparatus shown produces a signal representing the angle E in the following manner. Whenever the 1030 MHz receiver of the transponder 30 receives a North pulse burst, this burst is detected by the decoder 262 and a signal is applied to the timers 265 and 266 to clear the timers and turn them on. Sometime later, when the beam passes over the own aircraft, the beam interrogations are detected by the decoder 264 and a signal is applied to the timer 266 to transfer its time value to its output buffer. The time value determined by the timer 265 is transferred to its output buffer upon receipt of the next North pulse burst. The respective buffers output these time values to the logic element 267 until new time values are computed and the buffers updated. The logic element 267 determines the ratio between the signal received from the timer 266 and the signal received from timer 265, and produces an output signal of proper scale, representing the angle E.

The PRF selector 260 "tunes" the entire circuit to a single SSR ground station so that the angle E is associated with only one beam. As a typical example, if the beam of the ground station to which the circuit is tuned rotates 360° in 4 sec. or 4,000 msec, and if it takes 900 msec from the time the North pulse burst is received until the beam passes over the own aircraft, the angle E will be computed as 900/4,000 or 9/40 times 360° which equals 81°.

It will be understood that the present invention is not limited in use to aircraft-to-aircraft collision avoidance/proximity warning. There are numerous other applications of the present invention in the field of aviation alone. One such application will now be described in connection with FIGS. 26 and 27.

Figure 26:
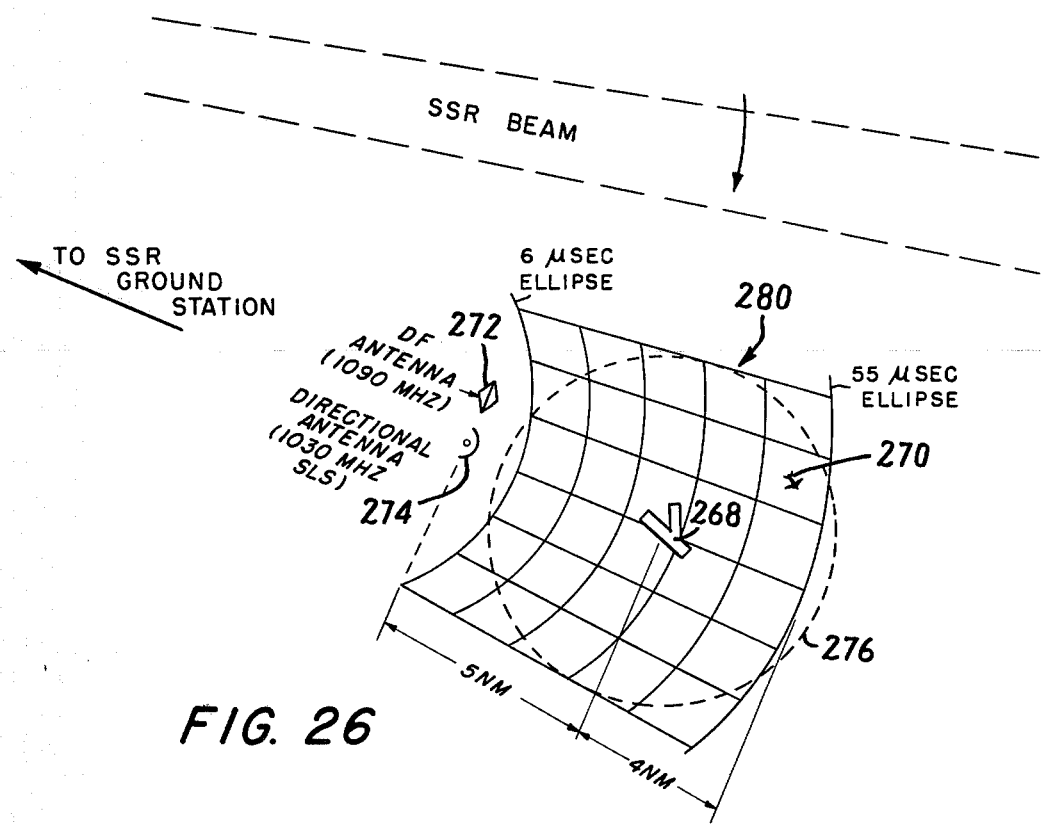
FIG. 26 is an aerial view showing the region surrounding an airport equipped with apparatus, according to the present invention, for monitoring aircraft in the vicinity of the airport.

FIG. 26 is essentially an aerial view of an airport and environs showing the airport landing strip 268 and an aircraft 270 making an approach for a landing. The airport shown may be any one of the numerous private airports around the country serving general aviation which is not equipped with an instrument landing system. Aircraft which use such an airport must follow visual flight rules (VFR) and are required to maintain only a minimum of voice communication with the airport.

The present invention may be used to provide the air traffic controller at the airport with a visual picture of the location of aircraft in the vicinity of the airport. This is accomplished by arranging both in a direction-finding antenna 272 and a directional antenna 274 between the airport and the nearest SSR ground station. The antennae are arranged sufficiently far from the airport, say 5 NM, so that the airport falls within the approximate center of a widened azimuth listen-in region.

The directional antenna 274 is connected to a 1030 MHz receiver which continually produces synthetic $F_1$ trigger pulses from the side lobe suppression $P_2$ pulses received from the SSR ground station. Due to the gain of the directional antenna, it is possible to receive the omni-directional side lobe suppression pulses at a great distance from the ground station.

The DF antenna 272 is connected to a passive range and bearing determining system of the type shown in FIG. 18. Since transponder replies are not required from the system, the listen-in period may be started at any time after the receipt of an interrogation. In the example shown, the listen-in period is initiated 6 $\mu$sec after the receipt of an interrogation, forming an inner ellipse approximately 1 NM away from the DF antenna 272; and the listen-in period is terminated 55 $\mu$sec after receipt of the interrogation, forming an outer ellipse approximately 9 NM away from the DF antenna.

Figure 27:
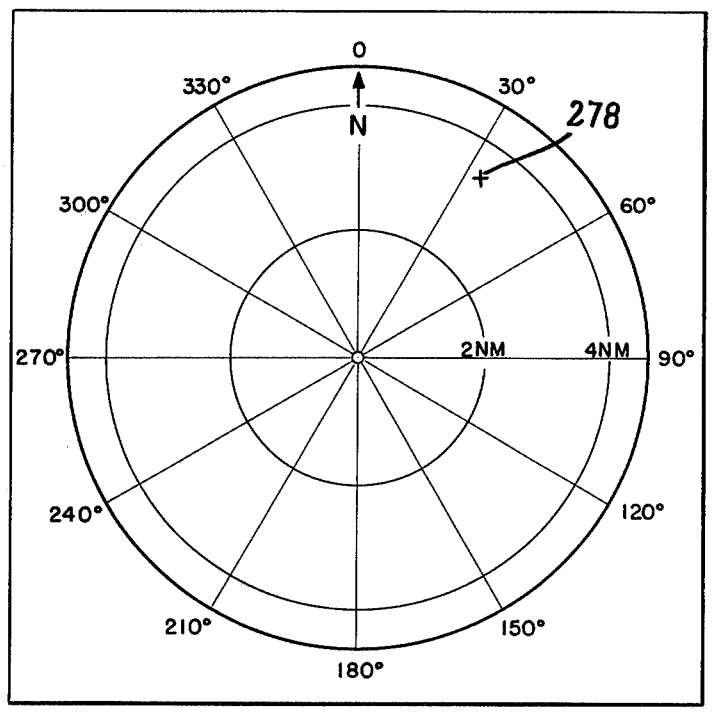
FIG. 27 is an elevational view showing the face of a cathode ray tube displaying the range and bearing of aircraft in the vicinity of the airport of FIG. 26.

The range from and bearing to the DF antenna, determined by the apparatus according to the present invention, may be mapped and displayed on the scope of a cathode ray tube for the air traffic controller at the airport. Such a display, which covers the region 276 indicated in dashed lines in FIG. 26, is shown in FIG. 27. In this display, the locus of the airport is at the center of the screen and an aircraft within a 4 to 5 NM radius of the airport is indicated as a blip 278 on the screen. The size of the region displayed on the screen may, of course, be varied by adjusting the size of the widened azimuth listen-in region 280 surrounding the airport.

Another application of the present invention in the field of aircraft collision avoidance/proximity warning concerns the problem of aircraft flying into the side of mountains, tall buildings, or any other vertical obstruction which extends high above the normal level of the ground. In this situation, a direction-finding antenna is placed at the top of the mountain or other obstruction, where it may receive 1030 MHz interrogations and/or side lobe suppression signals as well as the 1090 MHz replies from the transponders of any aircraft in the vicinity. Because of its elevation, the antenna should receive interrogations from a number of SSR ground stations so that the listen-in region should completely surround the antenna. Thus, the apparatus of the present invention connected to the antenna will be able to determine, completely passively, the altitude, range, bearing, closing velocity as well as the "tau" of any aircraft approaching the obstruction. If these parameters indicate a possible collision, an automatic alarm may be sent to the air traffic controller who can establish voice communication with the pilot of the approaching aircraft and warn him of possible collision.

Numerous other applications of the present invention will also occur to those skilled in the art. For example, the invention may be used to control marine traffic as well as air traffic. On the open sea, the present invention can provide ship captains with the range and bearing of other ships in the vicinity. In a harbor, the location and movement of each running ship may be displayed for a marine traffic controller with a system of the type described above in connection with FIGS. 26 and 27.

It will be understood that while various embodiments of the present invention, such as the embodiment illustrated in FIG. 18, are operative to determine bearing and/or range when only a single intruder craft has been detected, the apparatus may be modified in a manner well known in the art to sequentially determine the bearing and/or range of a plurality of intruder craft. For example, the apparatus may be locked to a single intruder craft during each rotation of the SSR beam by recognizing and filtering the identity code, altitude or time of arrival (TOA) of transponder replies of that single craft. Upon each subsequent beam rotation the identity, altitude or TOA may be updated until the bearing and/or range of all intruder craft have been determined.

It will also be understood that the present invention itself is susceptible to various modifications, changes and adaptions. For example, although the various embodiments of the invention have been independently described, it will be understood that these embodiments may be combined in various ways to form other embodiments without departing from the spirit and scope of the present invention.

Accordingly, it is intended that the scope of the present invention be limited only by the following claims.

I claim:

1. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said apparatus comprising in combination:
    a. direction-finding antenna means for receiving transponder replies transmitted by said other transponder station;
    b. direction-finding means, connected to said antenna means, for indicating the angle of incidence of said transponder replies on said antenna means;
    c. receiver means for detecting interrogations transmitted by a ground station when said beam is directed thereto; and
    d. timing means, connected to said receiver means, for enabling said direction-finding means to indicate said angle of incidence of a transponder reply to an interrogation after a predetermined period following the time that said interrogation would be received if said beam were directed at said receiver means; whereby the bearing to said other transponder station is indicated only if replies from such transponder station are received after said predetermined period.

2. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said apparatus comprising, in combination:
    a. direction-finding antenna means for receiving transponder replies transmitted by said other transponder station;
    b. direction-finding means, connected to said antenna means, for indicating the angle of incidence of said transponder replies on said antenna means;
    c. receiver means for detecting interrogations transmitted by a ground station when said beam is directed thereto; and
    d. timing means, connected to said receiver means, for disabling said direction-finding means from indicating said angle of incidence of a transponder reply to an interrogation after a predetermined period following the time that said interrogation would be received if said beam were directed at said receiver means;
    whereby the bearing to said other transponder station is indicated only if replies from such transponder station are received before said predetermined period.

3. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said apparatus comprising, in combination:
    a. direction-finding antenna means for receiving transponder replies transmitted by said other transponder station;
    b. direction-finding means, connected to said antenna means, for indicating the angle of incidence of said transponder replies on said antenna means;
    c. receiver means for detecting interrogations transmitted by a ground station when said beam is directed thereto; and
    d. timing means, connected to said receiver means, for enabling said direction-finding means to indicate said angle of incidence of a transponder reply to an interrogation during a predetermined period following the time that said interrogation would be received if said beam were directed at said receiver means;
    whereby the bearing to said other transponder station is indicated only if such transponder station is located within a selected region of space.

4. The proximity indicating apparatus defined in claim 3, wherein said timing means includes gating means, connected to said receiver means, for enabling said direction-finding means for said predetermined period following receipt of said interrogation.

5. The proximity indicating apparatus defined in claim 3, wherein said at least one ground station omnidirectionally transmits side lobe suppression signals; wherein said receiver means includes means for detecting said side lobe suppression signals; and wherein said timing means includes gating means, connected to said receiver means, for enabling said direction-finding means for said predetermined period following receipt of a side lobe suppression signal.

6. The proximity indicating apparatus defined in claim 3, wherein said timing means includes:
    1. generator means, connected to said receiver means, for continuously producing sync pulses in time with the interrogations transmitted by said ground station; and 2. gating means, connected to said generator means, for enabling said direction-finding means for said predetermined period following a sync pulse.

7. The proximity indicating apparatus defined in claim 3, further comprising:
   e. receiver means for detecting said transponder replies; and
   f. altitude decoder means, connected to said receiver means, for determining the altitude of said other transponder station from its replies,
   whereby the bearing to and altitude of said other transponder station may be indicated.

8. The proximity indicating apparatus defined in claim 7, wherein said apparatus is arranged on an aircraft having an altimeter, and wherein said apparatus further comprises comparator means, connected to said altitude decoder means and to said altimeter, for enabling said direction-finding means to indicate said angle of incidence when the altitude of said other transponder station is within predetermined limits of the altitude of said aircraft.

9. the proximity indicating apparatus defined in claim 8, further comprising means for changing said predetermined limits of said comparator means.

10. The proximity indicating apparatus defined in claim 9, wherein said means for changing said predetermined limits includes means for determining the direction of change of altitude of said aircraft.

11. The proximity indicating apparatus defined in claim 9, wherein said means for changing said predetermined limits includes means for determining the rate of change of altitude of said aircraft.

12. The proximity indicating apparatus defined in claim 7, further comprising second receiver means for detecting interrogations transmitted by a ground station when said beam is directed thereto and timing means, connected to said second receiver means, for enabling said direction-finding means to indicate said angle of incidence of a transponder reply to an interrogation during a predetermined period following the time that said interrogation would be received if said beam were directed at said second receiver means,
   whereby the bearing to said other transponder station is indicated only if such transponder station is located within a selected region of space.

13. The proximity indicating apparatus defined in claim 3, further comprising:
   e. second timing means, connected to said receiver means, for enabling said direction-finder means to indicate said angle of incidence of a transponder reply to an interrogation when said beam of said ground station is directed within a selected azimuth sector of its full rotation.

14. The proximity indicating apparatus defined in claim 3, further comprising:
   e. transmitter means for sending normal interrogations substantially omni-azimuthally;
   f. second receiver means for detecting transponder replies transmitted by said other transponder station;
   g. timer means, connected to said transmitter means and to said second receiver means, for determining the elapsed time between a transmitted interrogation and a received reply; and
   h. indicator means, connected to said timer means, for indicating the slant range of said other transponder station.

15. The proximity indicating apparatus defined in claim 3, in which said other transponder station is interrogated at a first frequency by said at least one ground station and replies to interrogations at a second frequency, and in which said other transponder station may be triggered by signals at said second frequency to reply at said second frequency, said apparatus further comprising:
   e. transmitter means for sending signals at said second frequency substantially omni-azimuthally;
   f. second receiver means for detecting transponder replies to said signals;
   g. timer means, connected to said transmitter means and to said second receiver means, for determining the elapsed time between a transmitted signal and a received reply; and
   h. indicator means, connected to said timer means, for indicating the slant range of said other transponder station.

16. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said apparatus comprising, in combination:
   a. direction-finding antenna means for receiving transponder replies transmitted by said other transponder station;
   b. direction-finding means, connected to said antenna means, for determining the angle of incidence of said transponder replies on said antenna means;
   c. first receiver means for detecting interrogations transmitted by the ground stations when the beams thereof sweep by said own station;
   d. means, connected to said first receiver means, for determining the angle of incidence on said own station of interrogations received from one of said ground stations;
   e. second receiver means for detecting transponder replies transmitted by said other transponder station;
   f. timer means, connected to said first and said second receiver means, for determining the difference ($T_D$) between the time that an interrogation would be received if the beam of said one ground station were directed at said first receiver means, and the time of receipt of a transponder reply to that interrogation;
   g. logic means, connected to said angle determining means and to said timer means, for determining the slant range from said own station to said other transponder station without transmission from said own station; and
   h. means, connected to said direction-finding means, said second receiver means and to said logic means, for indicating said angle of incidence of a transponder reply of, and said slant range to, said other transponder station if said transponder reply is received during a predetermined period following the time that the interrogation which elicited such reply would be received if its beam were directed at said own station.

17. The proximity indicating apparatus defined in claim 16, further comprising means for averaging a succession of time differences ($T_D$) determined by said timer means, and supplying the average to said logic means.

18. The proximity indicating apparatus defined in claim 17, wherein said average is taken over a time of approximately one dwell period of said beam of a ground station.

19. The proximity indicating apparatus defined in claim 16, further comprising means for averaging a plurality of slant ranges.

20. The proximity indicating apparatus defined in claim 19, wherein said averaging means includes a plurality of memory means for storing a plurality of slant ranges and second logic means connected to said memory means, for determining the average of the slant ranges stored in said memory means.

21. The proximity indicating apparatus defined in claim 19, wherein said averaging means includes discriminator means for eliminating inconsistent slant ranges from the computed average of slant ranges.

22. The proximity indicating apparatus defined in claim 19, wherein said average is taken over a time of approximately one rotation period of said beam of a ground station.

23. The apparatus defined in claim 16, wherein said direction-finding antenna means is operative to receive interrogations transmitted by said at least one ground station and means (d) includes direction-finding means, connected to said antenna means, for determining the angle of incidence of said interrogations.

24. The apparatus defined in claim 16, wherein said ground stations omni-azimuthally transmit a reference signal as the respective beams thereof sweep through a standardized reference direction, such as magnetic North; wherein said first receiver means is operative to detect said reference signals and to select the interrogations and reference signals received from said one ground station; and wherein means (d) includes means, connected to said first receiver means, for determining the elapsed time between the receipt of a selected reference signal and said selected interrogations for a given beam rotation of said one ground station, said time being proportional to the azimuth of said beam of said one ground station when it is directed at said first receiver means.

25. The apparatus defined in claim 16, wherein said apparatus is arranged on an aircraft having a altimeter, and wherein said apparatus further comprises altitude decoder means, connected to said second receiver means, for determining the altitude of said other transponder station from its replies; comparator means, connected to said altitude decoder means and to said altimeter, for producing a signal representative of the periods when the altitude of said other transponder station is within predetermined limits of the altitude of said aircraft; and means, connected to said direction-finding means, said logic means and said comparator means for indicating said angle of incidence of said transponder replies of, and said slant range to, said other transponder station when said other transponder station is within predetermined limits of the altitude of said aircraft.

26. The apparatus defined in claim 16, further comprising means, connected to said first receiver means, for generating a signal synchronized with the interrogations transmitted by said one ground station and indicative of the time that said interrogations would be received if the beam of said one ground station were directed at said first receiver means although said beam may be directed away therefrom; and wherein said timer means is connected to said signal generating means.

27. Proximity indicating apparatus situated at an "own" station for use in a azimuthally scanning secondary surveillance radar (SSR) system in which at least one transponder situated at an "other" station in the proximity of said own station is interrogated by the narrow rotating beam of at least one ground station remote from said own and said other station, said ground stations omni-directionally transmitting a reference signal as the respective beams thereof sweep through a standardized reference direction, such as magnetic North, said apparatus comprising, in combination:

a. direction-finding antenna means for receiving transponder replies transmitted by said other transponder station;

b. direction-finding means, connected to said antenna means, for determining the angle of incidence of said transponder replies on said antenna means;

c. first receiver means for receiving said reference signals and said interrogations transmitted by said ground stations and producing an output responsive only to the reference signal and interrogations of a selected one of said ground stations; and d. first timer means, connected to said first receiver means, for determining the elapsed time between the receipt of said reference signal and said interrogations for a given beam rotation of said selected ground station;

whereby said time is proportional to the azimuth of said beam of said selected ground station when it is directed at said first receiver means.

28. The proximity indicating apparatus defined in claim 27, further comprising:

e. second receiver means for detecting transponder replies transmitted by said other transponder station; and f. second timer means, connected to said first and second receiver means, for determining the difference ($T_D$) between the time that an interrogation would be received if said beam were directed at said first receiver means, and the time of receipt of a transponder reply to said interrogation.

29. The proximity indicating apparatus defined in claim 27, further comprising first logic means, connected to said direction-finding means and said first timer means, for determining the angle (D) between the directions of incidence of an interrogation and a transponder reply.

30. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said ground stations omni-directionally transmitting a reference signal as the respective beams thereof sweep through a standardized reference direction, such as magnetic North, said apparatus comprising, in combination:

a. direction-finding antenna means for receiving transponder replies transmitted by said other transponder station;

b. direction-finding means, connected to said antenna means, for determining the angle of incidence of said transponder replies on said antenna means;

c. first receiver means for receiving said reference signals and said interrogations transmitted by said ground stations and producing an output responsive only to the reference signal and interrogations of a selected one of said ground stations;

d. first timer means, connected to said first receiver means, for determining the elapsed time between the receipt of said reference signal and said interrogations for a given beam rotation of said selected ground station;

e. second receiver means for detecting transponder replies transmitted by said other transponder station; f. second timer means, connected to said first and second receiver means, for determining the difference ($T_D$) between the time that a interrogation would be received if said beam were directed at said first receiver means, and the time of receipt of a transponder reply to said interrogation;

g. logic means, connected to said direction-finding means and to said second timer means, for determining the slant range from said own station to said other transponder station without transmission from said own station.

31. The proximity indicating apparatus defined in claim 30, wherein said logic means includes:

1. first logic means, connected to said direction-finding means and said first timer means, for determining the angle (D) between the directions of incidence of an interrogation and a transponder reply;
2. second logic means, connected to said first logic means, for determining the valve (1− cos D) of one minus the cosine of said angle (D) between said directions of incidence; and
3. third logic means, connected to said second timer means and to said second logic means, for determining the value $T_D/(1 - \cos D)$ of the quotient of said time difference ($T_D$) divided by said value of one minus the cosine of said angle (D) between said directions of incidence.

32. The proximity indicating apparatus defined in claim 31, further comprising means for averaging a succession of angles (D) determined by said first logic means, and supplying the average to said second logic means.

33. The proximity indicating apparatus defined in claim 32, wherein said average is taken over a time of approximately one dwell period of said beam of a ground station.

34. The proximity indicating apparatus defined in claim 30, further comprising means for averaging a succession of time differences ($T_D$) determined by said second timer means, and supplying the average to said logic means.

35. Th proximity indicating apparatus defined in claim 34, wherein said average is taken over a time of approximately one dwell period of said beam of a ground station.

36. The proximity indicating apparatus defined in claim 30, further comprising means for avergíng a plurality of slant ranges.

37. The proximity indicating apparatus defined in claim 36, wherein said averaging means includes a plurality of memory means for storing a plurality of slant ranges and second logic means connected to said memory means, for determining the average of the slant ranges stored in said memory means.

38. The proximity indicating apparatus defined in claim 36, wherein said averaging means includes discriminator means for eliminating inconsistent slant ranges from the computed average of slant ranges.

39. The proximity indicating apparatus defined in claim 36, wherein said average is taken over a time of approximately one rotation period of said beam of a ground station.

40. A process for detecting at an "own" station the proximity of mobile, transponder-carrying vehicles in an azimuthally scanning secondary surveillance radar (SSR) system wherein vehicle transponders in the proximity of said own station reply to interrogations transmitted in a narrow, rotating beam of at least one ground station remote from said own station and said vehicle transponders, said process comprising the steps of:

a. receiving transponder replies to an interrogation at said own station during a predetermined period following the time that said interrogation would be received if said beam were directed toward said own station; and b. determining the angle of incidence of said transponder replies received during said predetermined period.

41. The process defined in claim 40, further comprising the steps of:

c. receiving interrogations transmitted by a ground station; and d. indicating said angle of incidence of transponder replies when the beam of said ground station is directed within a selected azimuth sector of its full rotation.

42. The process defined in claim 40 further comprising the steps of:

c. transmitting normal interrogations omni-azimuthally to nearby vehicle transponders;

d. receiving transponder replies to said transmitted interrogations;

e. determining the angle of incidence of said transponder replies to said transmitted interrogations to obtain the bearing to a nearby vehicle transponder; and f. determining the elapsed time between a transmitted interrogation and a received reply thereto to obtain the slant range to a nearby vehicle transponder.

43. The process defined in claim 40, in which said vehicle transponders are successively interrogated at a first frequency by said at least one ground station and reply to interrogations at a second frequency, and in which the vehicle transponders may be triggered by signals at said second frequency to reply at said second frequency, said process further comprising the steps of:

c. transmitting signals omni-azimuthally to nearby vehicle transponders at said second frequency;

d. receiving transponder replies to said transmitted signals;

e. determining the angle of incidence of said transponder replies to said transmitted signals to obtain the bearing to a nearby vehicle transponder;

f. determing the elapsed time between a transmitted signal and a received reply thereto to obtain the slant range to a nearby vehicle transponder.

44. The process defined in claim 40, further comprising the step of: decoding the altitude of a replying transponder from its replies.

45. The process defined in claim 44, wherein said process is carried out in an aircraft having an altimeter, and said process further comprises the steps of comparing the decoded altitude of the replying transponder with the altitude of the aircraft determined by the altimeter and indicating said angle of incidence only if the two altitudes are within predetermined limits of each other.

46. A process for detecting at an "own" station the proximity of mobile, transponder-carrying vehicles in an azimuthally scanning secondary surveillance radar (SSR) system wherein vehicle transponders in the proximity of said own station reply to interrogations transmitted in a narrow, rotating beam of at least one ground station remote from said own station and said vehicle transponders, said ground stations omni-directionally transmitting a reference signal as the respective beams thereof sweep through a standardized reference direction, such as magnetic North, said process comprising the steps of:
  a. receiving said reference signals transmitted by said ground stations;
  b. receiving said interrogations transmitted by said ground stations;
  c. selecting the reference signal and interrogations received from one of said ground stations;
  d. determining the elapsed time between the receipt of said selected reference signal and said selected interrogations for a given beam rotation of said one ground station;
  e. determining the angle of incidence of transponder replies,
  thereby to obtain the bearing of a nearby vehicle transponder and the azimuth of said beam of said one ground station when it is directed at the place of said own station where said interrogatories are received.

47. The process defined in claim 46 further comprising the steps of:
  f. determining the difference ($T_D$) between the time that an interrogation would be received if the beam of said ground station were directed toward the place of receipt at said own station of said transponder replies and the time of receipt of a transponder reply to that interrogation; and
  g. determining the slant range from said own station to said vehicle transponder, without transmission from said own station.

48. Proximity indicating apparatus situated at an "own" station for use in an azimuthally scanning secondary surveillance radar (SSR) system in which at least one transponder situated at an "other" station in the proximity of said own station is interrogated by the narrow rotating beam of at least one ground station remote from said own and said other station, said apparatus comprising, in combination:
  a. direction-finding antenna means, for receiving transponder replies transmitted by said other transponder station;
  b. direction-finding means, connected to said antenna means, for determining the angle of incidence of said transponder replies on said antenna means;
  c. first receiver means for detecting interrogations transmitted by a ground station when said beam is directed thereto;
  d. means, connected to said first receiver means, for determining the angle of incidence on said own station of interrogations received from one of said ground stations;
  e. second receiver means for detecting transponder replies transmitted by said other transponder station;
  f. timer means connected to said first and said second receiver means, for determining the difference ($T_D$) between the time that an interrogation would be received if the beam of said one ground station were directed at said first receiver means, and the time of receipt of a transponder reply to that interrogation;
  g. first logic means, connected to said angle determining means, for determining the angle (D) between the directions of incidence of an interrogation and a transponder reply;
  h. second logic means, connected to said first logic means, for determining the value (1 − cos D) of one minus the cosine of said angle (D) between said directions of incidence; and
  i. third logic means, connected to said timer means and to said second logic means, for determining the value $T_D/(1 - \cos D)$ of the quotient of said time difference ($T_D$) divided by said value of one minus the cosine of said angle (D) between said directions of incidence;
  whereby said quotient is proportional to the slant range from said own station to said other transponder station.

49. The proximity indicating apparatus defined in claim 48, further comprising means for averaging a succession of angles (D) determined by said first logic means, and supplying the average to said second logic means.

50. The proximity indicating apparatus defined in claim 49, wherein said average is taken over a time of approximately one dwell period of said beam of a ground station.

51. A process for detecting at an "own" station the proximity of mobile, transponder-carrying vehicles in an azimuthally scanning secondary surveillance radar (SSR) system wherein vehicle transponders in the proximity of said own station reply to interrogations transmitted in a narrow, rotating beam of at least one ground station remote from said own station and said vehicle transponders, said process comprising the steps of:
  a. receiving transponder replies to an interrogation at said own station during a predetermined period following the time that said interrogation would be received if said beam were directed toward said own station;
  b. determining the angle of incidence of said transponder replies received during said predetermined period;
  c. determining the angle of incidence of interrogations transmitted by a ground station;
  d. determining the difference ($T_D$) between the time that an interrogation would be received if the beam of said ground station were directed toward the place of receipt at said own station of said transponder replies and the time of receipt of a transponder reply to that interrogation; and
  e. determining the slant range from said own station to said vehicle transponder, without transmission from said own station.

* * * * *